(12) United States Patent
Markov

(10) Patent No.: US 9,346,545 B2
(45) Date of Patent: May 24, 2016

(54) AERIAL GRANULAR MATERIAL DISTRIBUTION DEVICE

(71) Applicant: Michael Beaugavin Markov, Oceanside, CA (US)

(72) Inventor: Michael Beaugavin Markov, Oceanside, CA (US)

( * ) Notice: Subject to any disclaimer, the term of this patent is extended or adjusted under 35 U.S.C. 154(b) by 0 days.

(21) Appl. No.: 14/596,997

(22) Filed: Jan. 14, 2015

(65) Prior Publication Data

US 2015/0151325 A1 Jun. 4, 2015

Related U.S. Application Data

(62) Division of application No. 13/784,469, filed on Mar. 4, 2013.

(51) Int. Cl.
| | |
|---|---|
| *B05C 19/04* | (2006.01) |
| *B05C 19/00* | (2006.01) |
| *B64D 1/02* | (2006.01) |
| *B64C 39/02* | (2006.01) |
| *B64D 1/16* | (2006.01) |

(52) U.S. Cl.
CPC ............... *B64D 1/02* (2013.01); *B05C 19/008* (2013.01); *B05C 19/04* (2013.01); *B64C 39/024* (2013.01); *B64D 1/16* (2013.01)

(58) Field of Classification Search
CPC .................................. B64B 19/00; B64B 1/00
USPC ........... 239/171, 462, 575, DIG. 23; 209/352, 209/353, 357, 365.1, 397, 401; 47/1.41
See application file for complete search history.

(56) References Cited

U.S. PATENT DOCUMENTS

| | | | |
|---|---|---|---|
| 2,583,884 A | 1/1952 | Walter | |
| 3,860,202 A | 1/1975 | Johnson | |
| 3,962,821 A | 6/1976 | Sharp | |
| 4,260,108 A | 4/1981 | Maedgen, Jr. | |
| 4,290,500 A | 9/1981 | Hopkins et al. | |
| 4,382,568 A | 5/1983 | Schertz | |
| 5,078,090 A | 1/1992 | Richman | |
| 5,148,989 A | 9/1992 | Skinner | |
| 5,279,481 A | 1/1994 | Trotter | |
| 5,794,847 A | 8/1998 | Stocker | |
| 6,003,782 A * | 12/1999 | Kim ...................... | B64D 47/08 169/53 |
| 6,243,649 B1 | 6/2001 | Wetherbee et al. | |
| 6,318,023 B1 | 11/2001 | Yamashita | |

(Continued)

OTHER PUBLICATIONS

Official Action for U.S. Appl. No. 13/784,469 mailed Nov. 10, 2015.

(Continued)

*Primary Examiner* — Len Tran
*Assistant Examiner* — Tuongminh Pham
(74) *Attorney, Agent, or Firm* — Thomas J. Lavan

(57) ABSTRACT

A device for distributing granular material to a target area from an aircraft is provided. The device includes one or more electric sifters, and each of the one or more electric sifters includes a motor to distribute the granular material on the target area and a screen on the bottom surface of the electric sifter. The granular material is stored in the one or more electric sifters. The screen includes a first portion and a second portion. The first portion allows the granular material to pass through the screen to the target area. The second portion prevents the granular material from passing through the screen. The device also includes a circuit to control the motors, one or more power sources to power the motor and the circuit, and an interface for a human operator to control the circuit.

8 Claims, 15 Drawing Sheets

(56) References Cited

U.S. PATENT DOCUMENTS

| | | |
|---|---|---|
| 6,328,638 B1 | 12/2001 | Hopkins |
| 6,619,226 B2 | 9/2003 | Rooke |
| 7,398,740 B2 | 7/2008 | Boncodin |
| 7,467,716 B2 | 12/2008 | Kraus |
| 7,717,356 B2 | 5/2010 | Petersen |
| 2005/0072880 A1 | 4/2005 | Nolan |
| 2009/0132100 A1 | 5/2009 | Shibata |
| 2010/0006667 A1 | 1/2010 | Nielsen et al. |
| 2011/0264307 A1 | 10/2011 | Guyette et al. |
| 2012/0199064 A1 | 8/2012 | Foy |
| 2012/0248248 A1 | 10/2012 | Thompson |
| 2012/0297671 A1 | 11/2012 | Sexton et al. |
| 2014/0246545 A1 | 9/2014 | Markov |
| 2015/0041593 A1 | 2/2015 | Markov |
| 2015/0041596 A1 | 2/2015 | Markov |

OTHER PUBLICATIONS

Official Action for U.S. Appl. No. 14/597,018 mailed Dec. 16, 2015.
Sureset-Apex data sheet, Fusion 360, Turlock, California, 95380, Feb. 15, 2013.
Official Action for U.S. Appl. No. 13/784,469 mailed Feb. 13, 2015.
Official Action for U.S. Appl. No. 13/784,469 mailed Feb. 18, 2016.
Official Action for U.S. Appl. No. 14/517,866 mailed Mar. 10, 2016.
Official Action for U.S. Appl. No. 14/597,018 mailed Mar. 1, 2016.
Measurement and Control, K. Kadlec, p. 5 and 6 2008.

* cited by examiner

Fig. 1a  Granular material dispersal system using airplane

- 104 airplane
- 112 enclosure (1 of 2)
- 108 spray boom
- 124 granular material
- 116 target area
- 116 target area
- 120 flowers Fig. 1b  Airplane side view

- 104 airplane
- 112 enclosure (1 of 2)
- 108 spray boom

Fig. 2a  Granular material dispersal system using helicopter
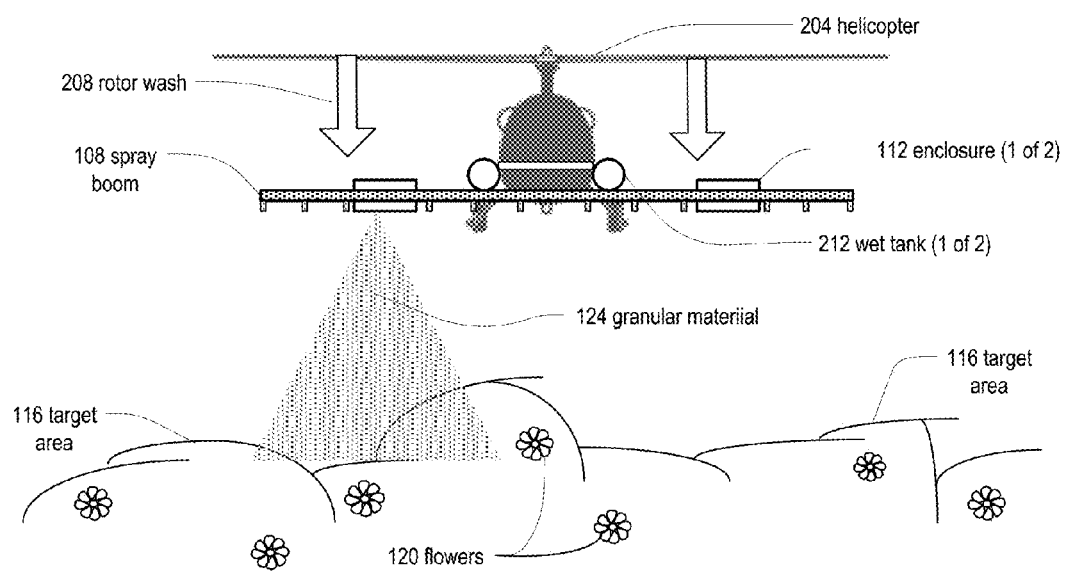
Fig. 2b  Helicopter side view
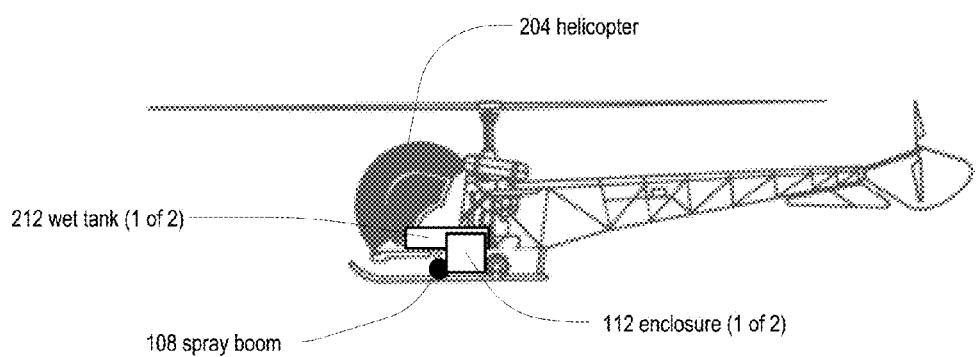

*Fig. 3a Front isometric view of enclosure without electric sifters*
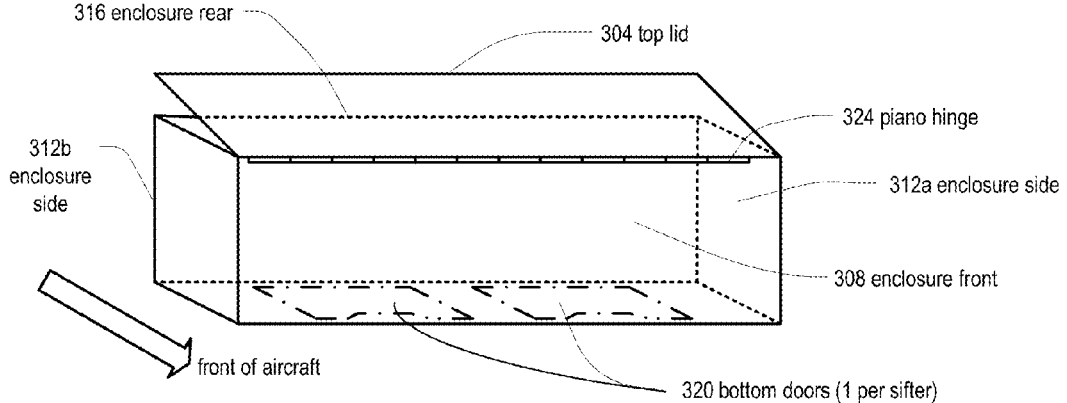
*Fig. 3b Side view of enclosure containing electric sifters, lid and door open*
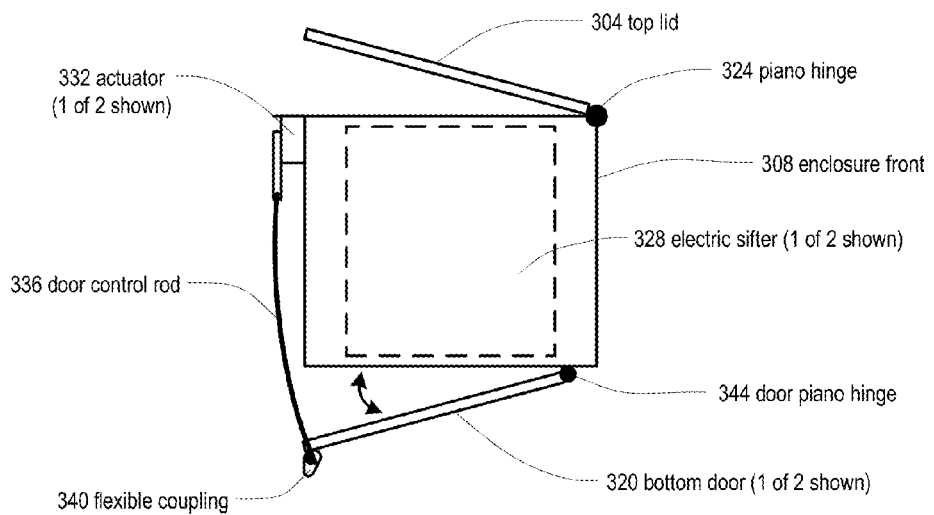

Fig. 4a  Side view of mounted enclosure containing electric sifter, lid closed and door closed
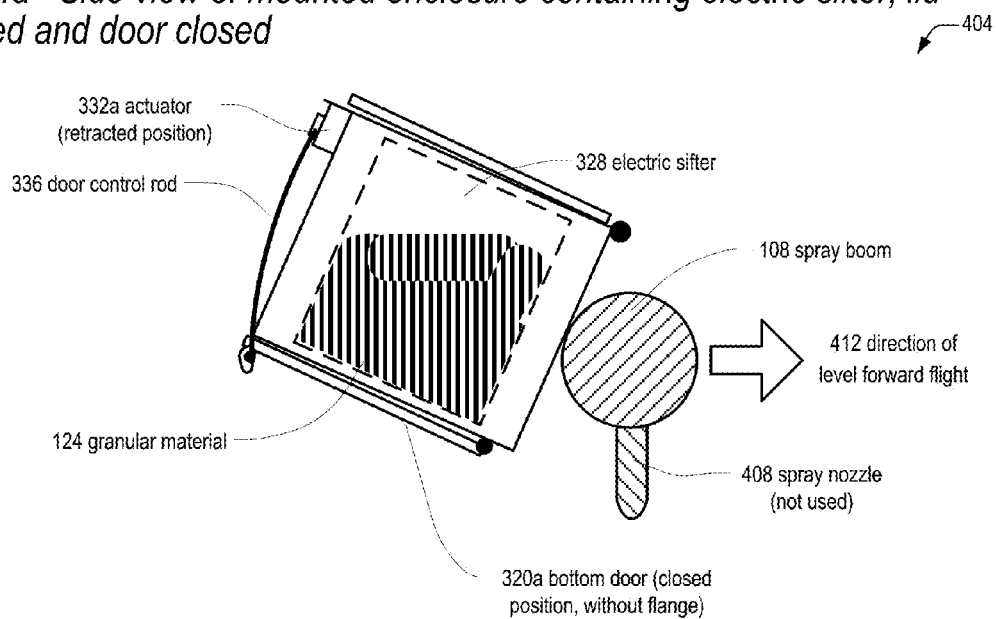
Fig. 4b  Side view of mounted enclosure containing electric sifter, lid closed and door open
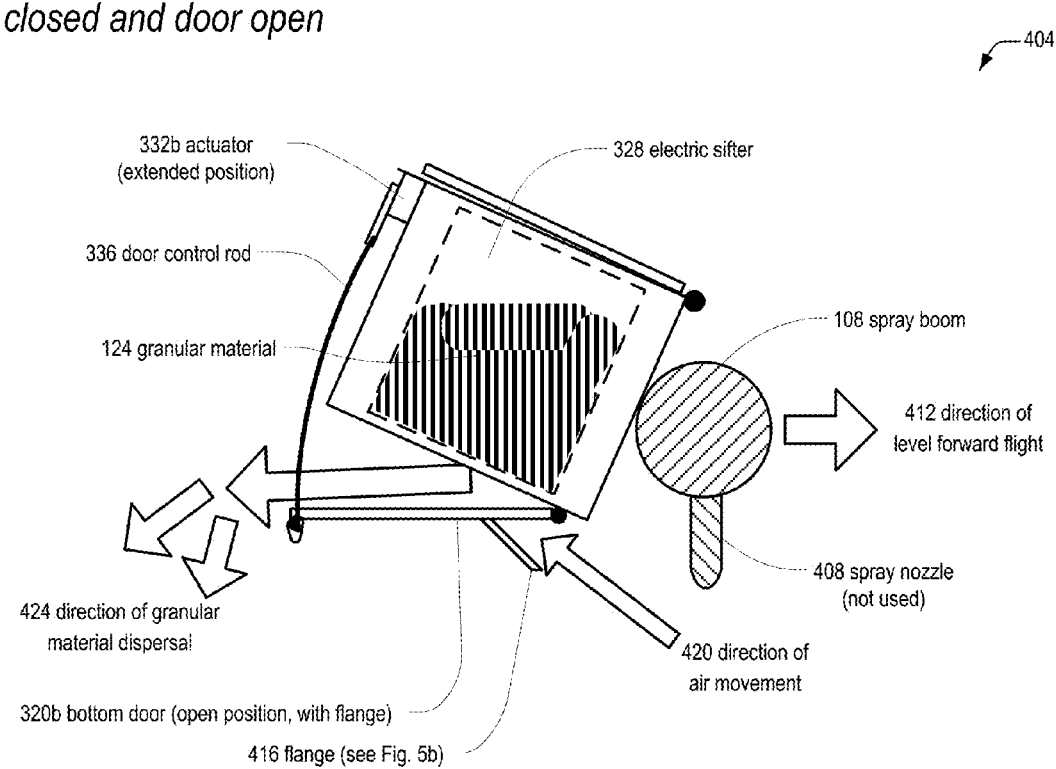

*Fig. 5a   Door detail, without flange*
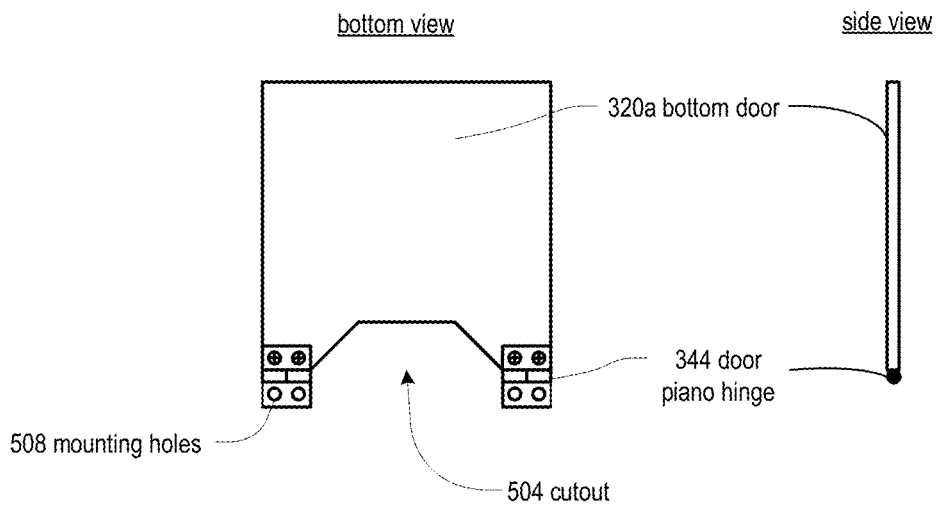
*Fig. 5b   Door detail, with flange*
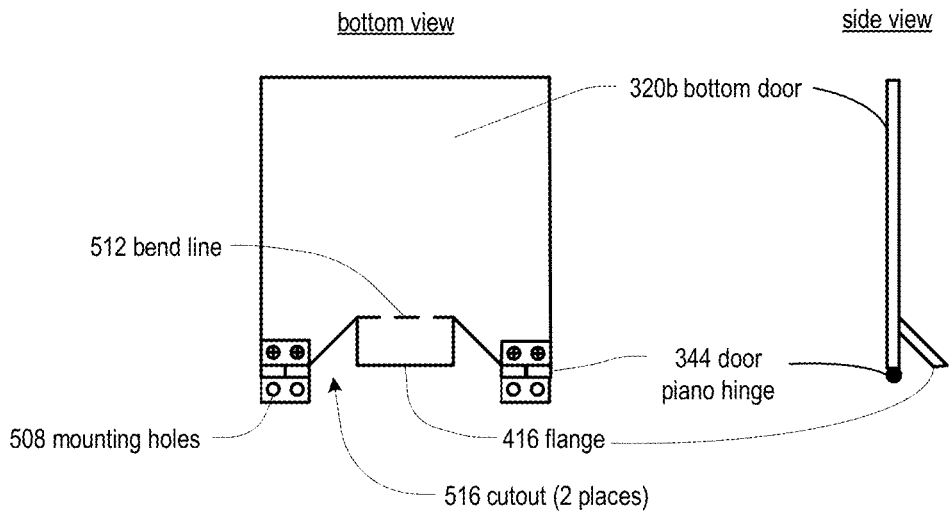

Fig. 6 Electric sifter detail, first embodiment
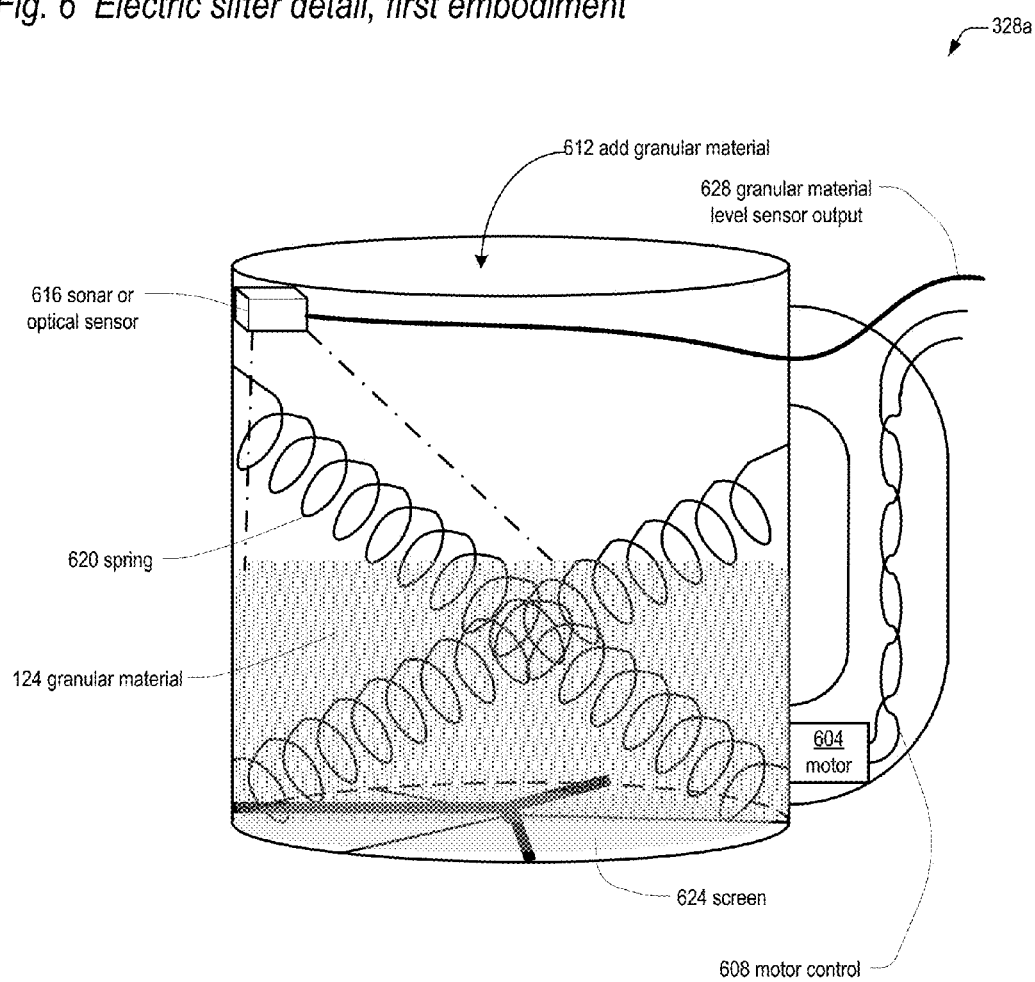

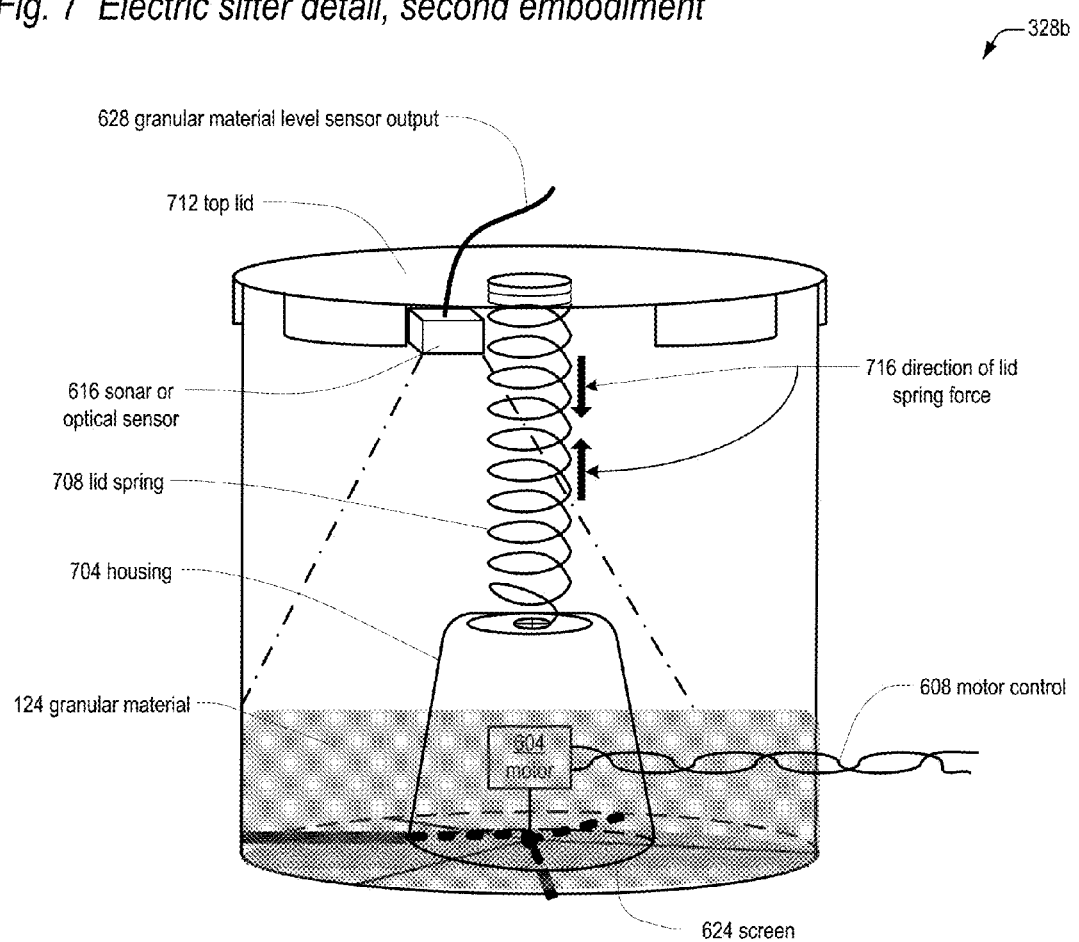
Fig. 7 Electric sifter detail, second embodiment

Fig. 8a Sifter screen, first embodiment
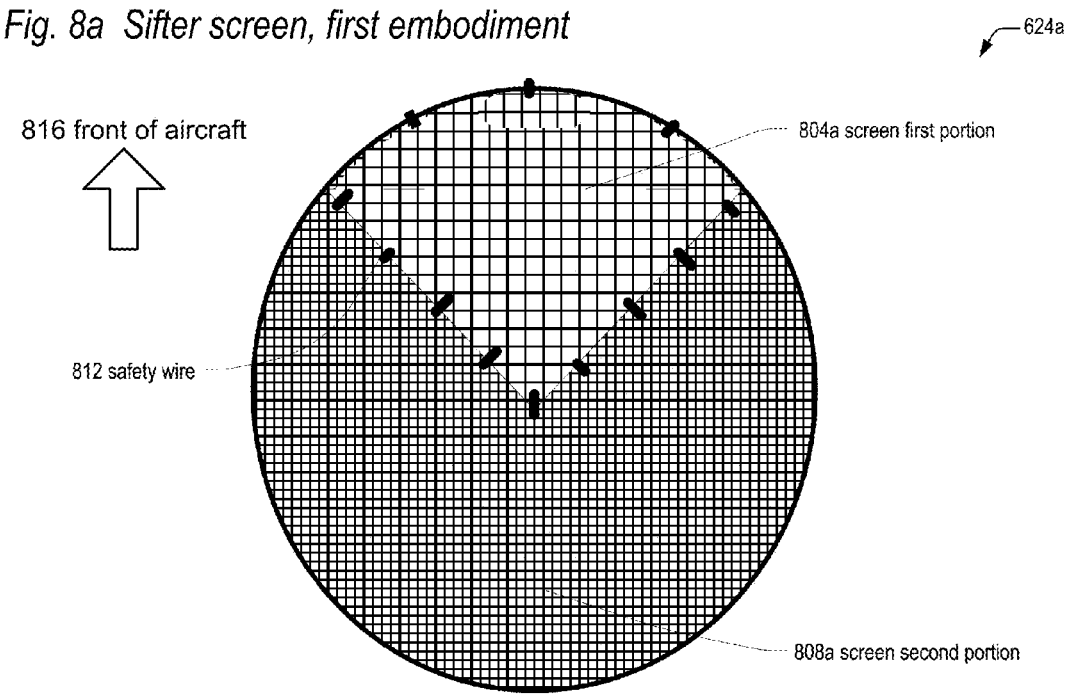
Fig. 8b Sifter screen, second embodiment
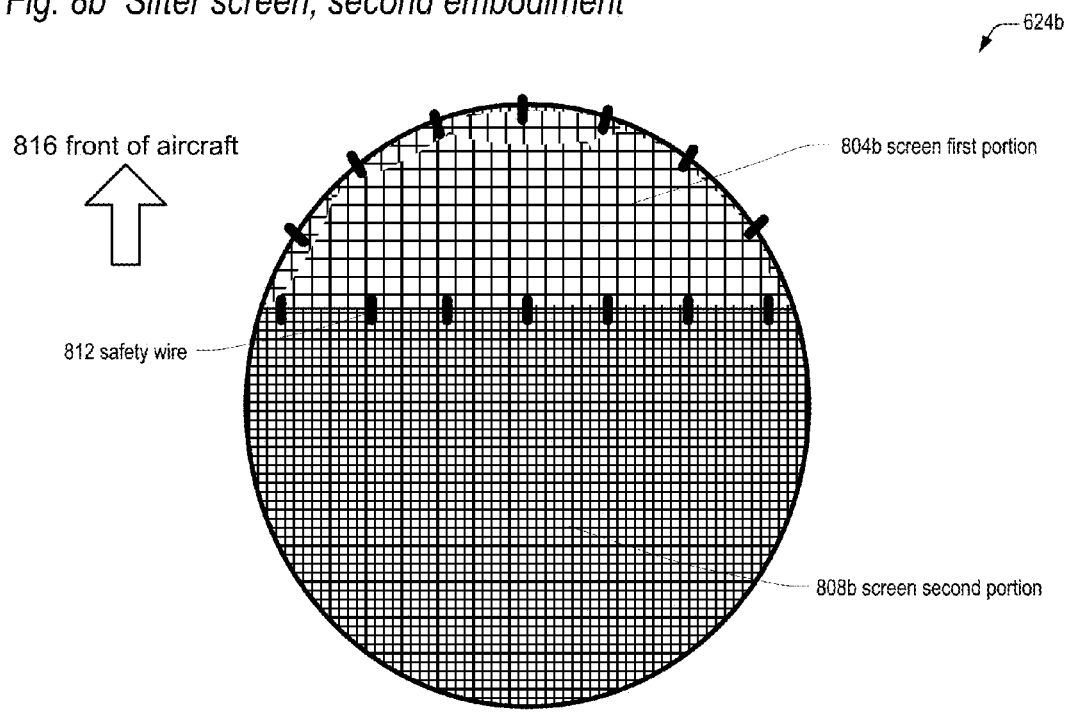

Fig. 9a  Granular material dispersal apparatus block diagram
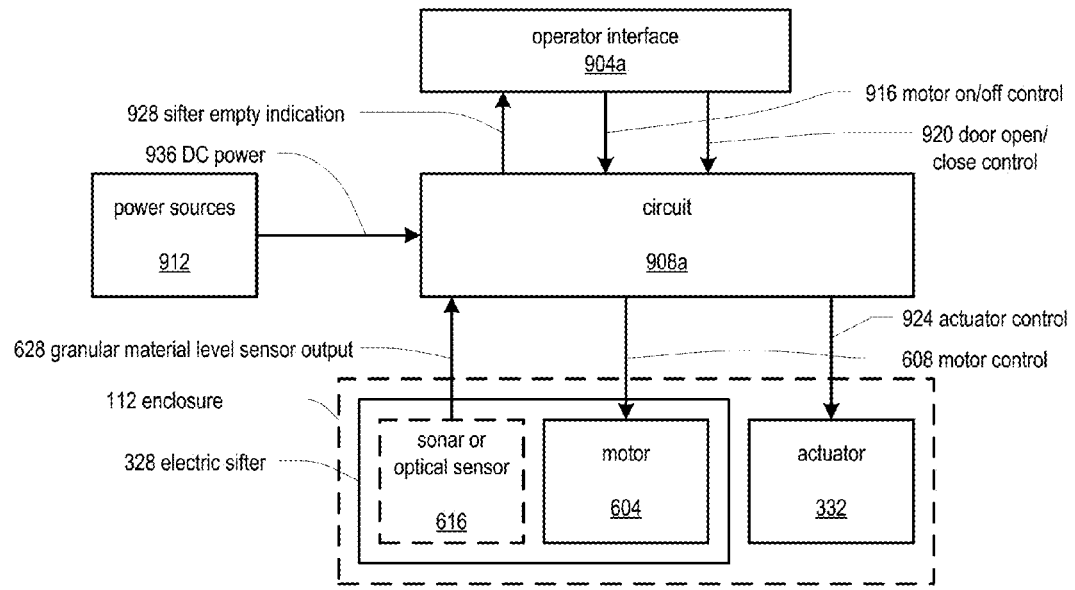
Fig. 9b  Granular material dispersal apparatus block diagram
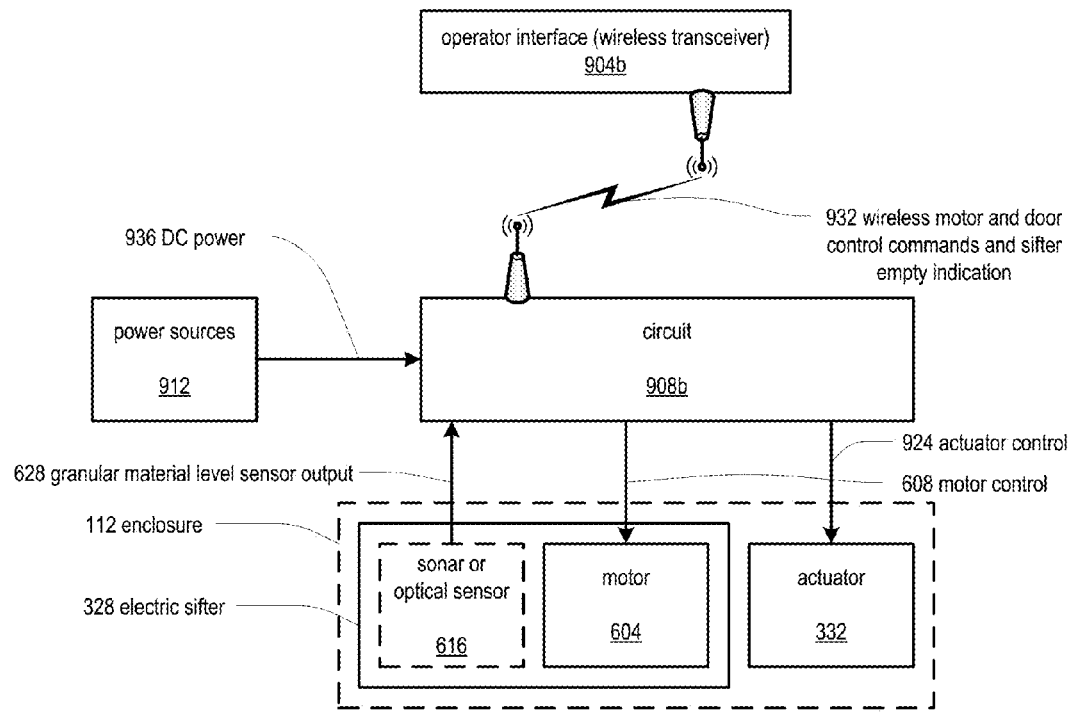

Fig. 10a  Circuit block diagram using wired control
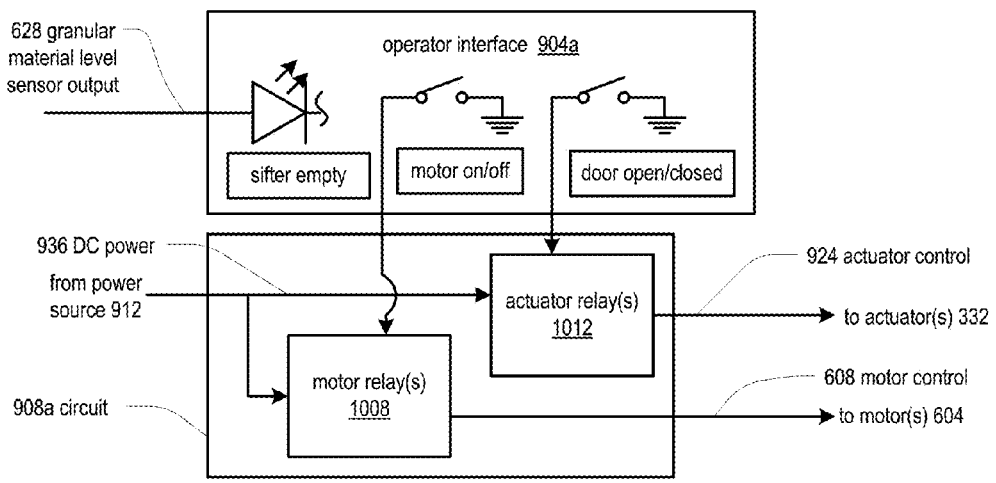
Fig. 10b  Circuit block diagram with wireless control
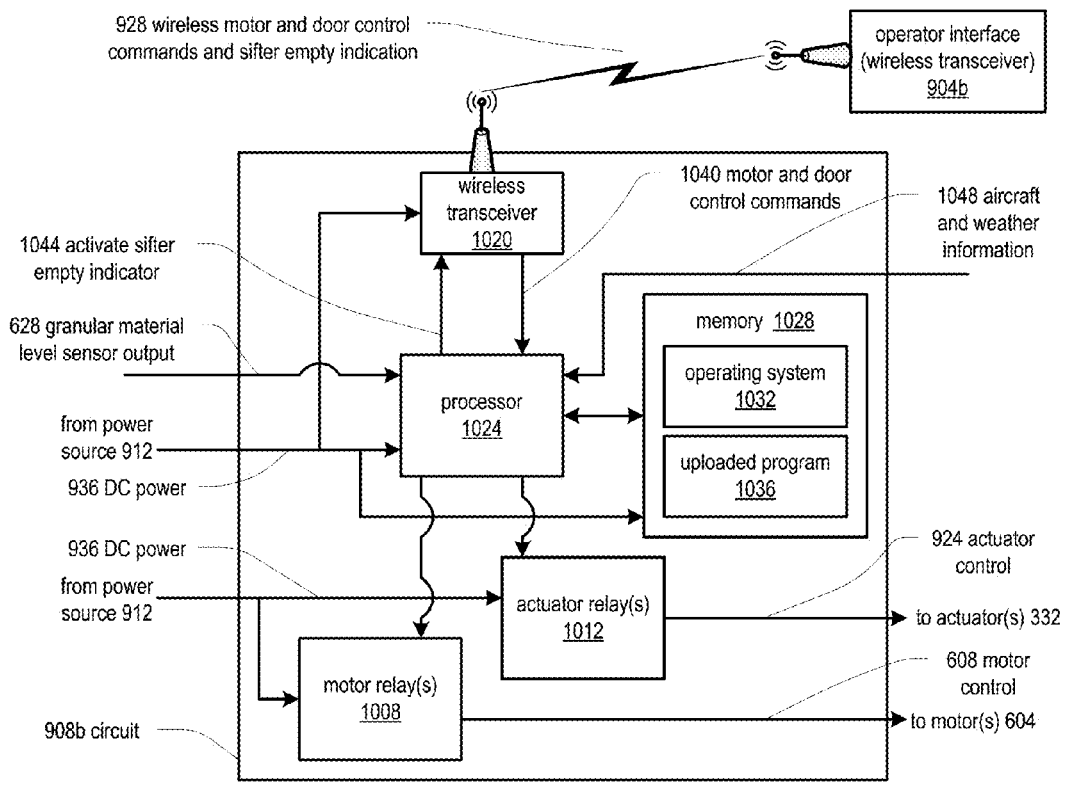

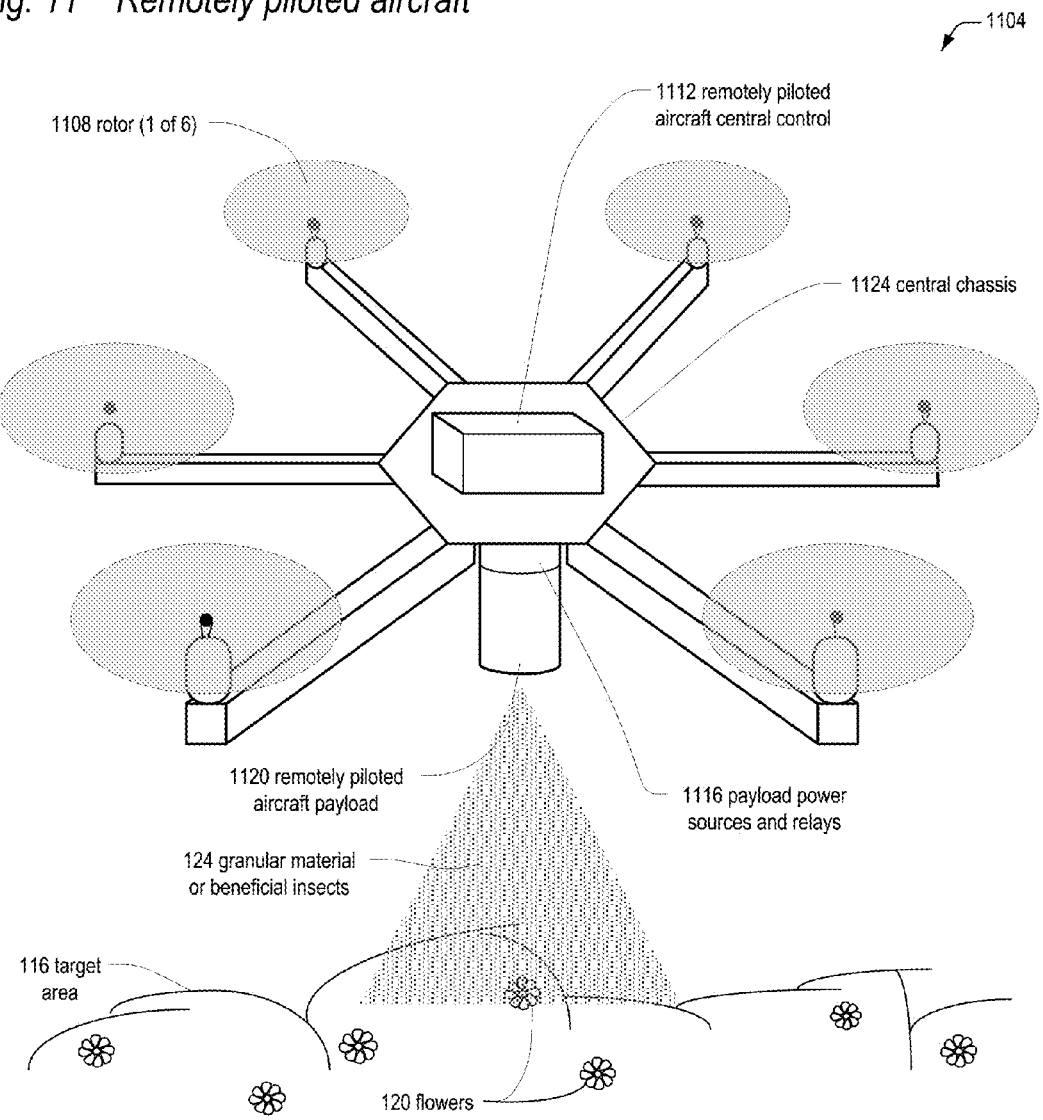
Fig. 11  Remotely piloted aircraft

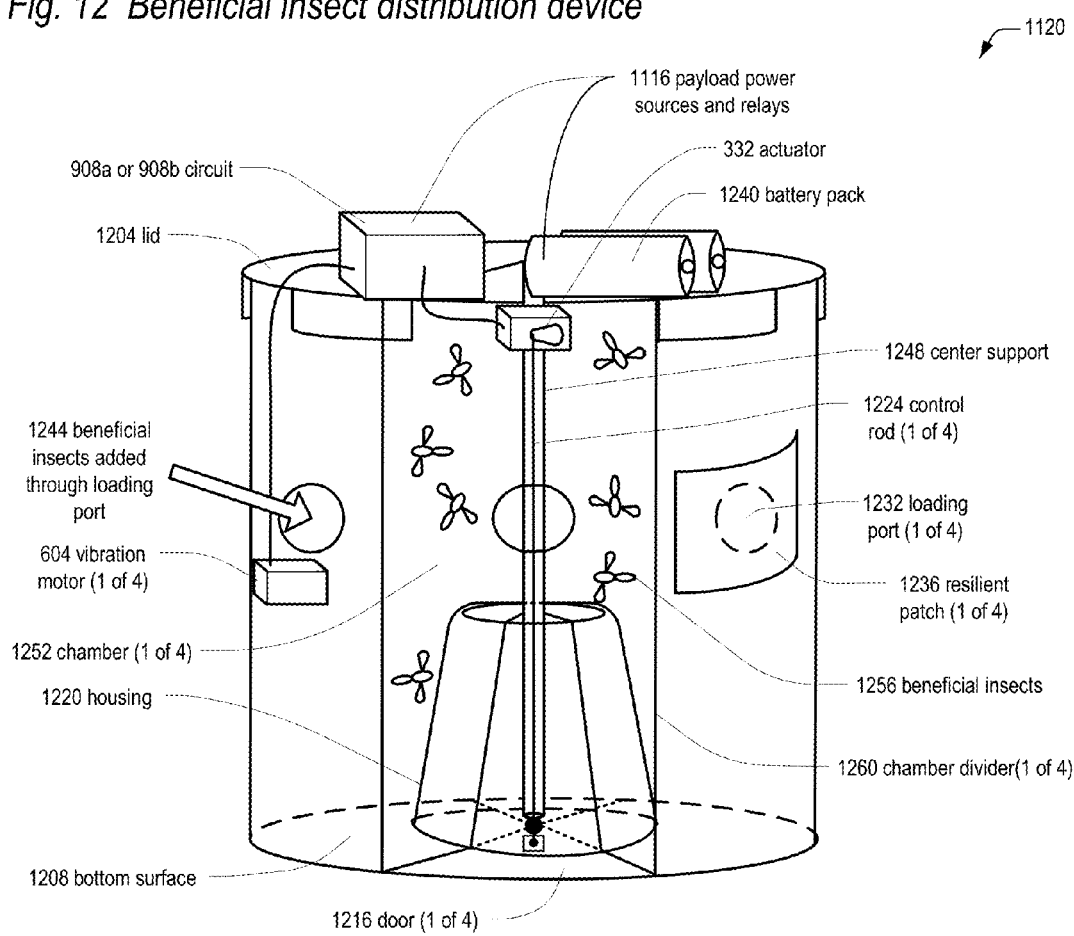
Fig. 12 Beneficial insect distribution device

Fig. 13a  beneficial insect distribution device lid, inside surface
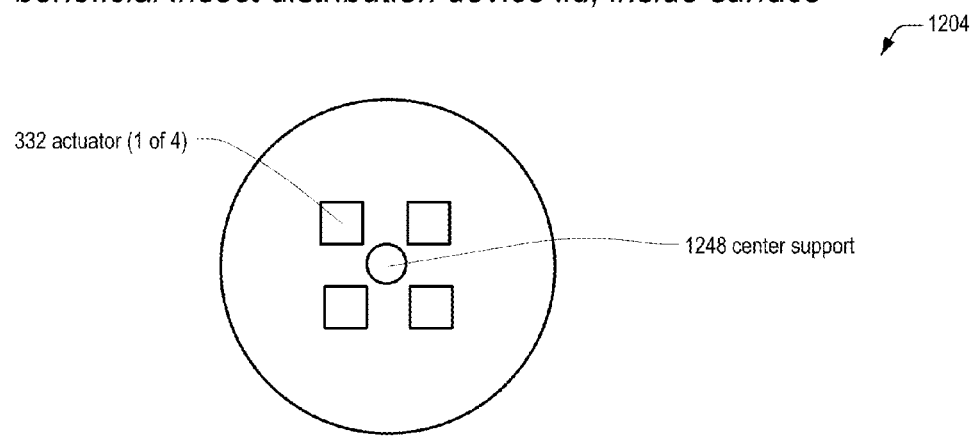
Fig. 13b  beneficial insect distribution device bottom, inside surface
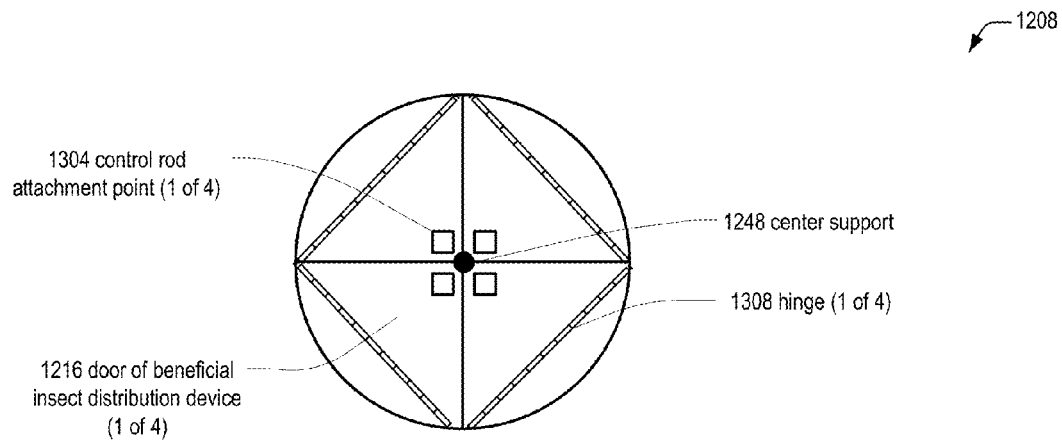

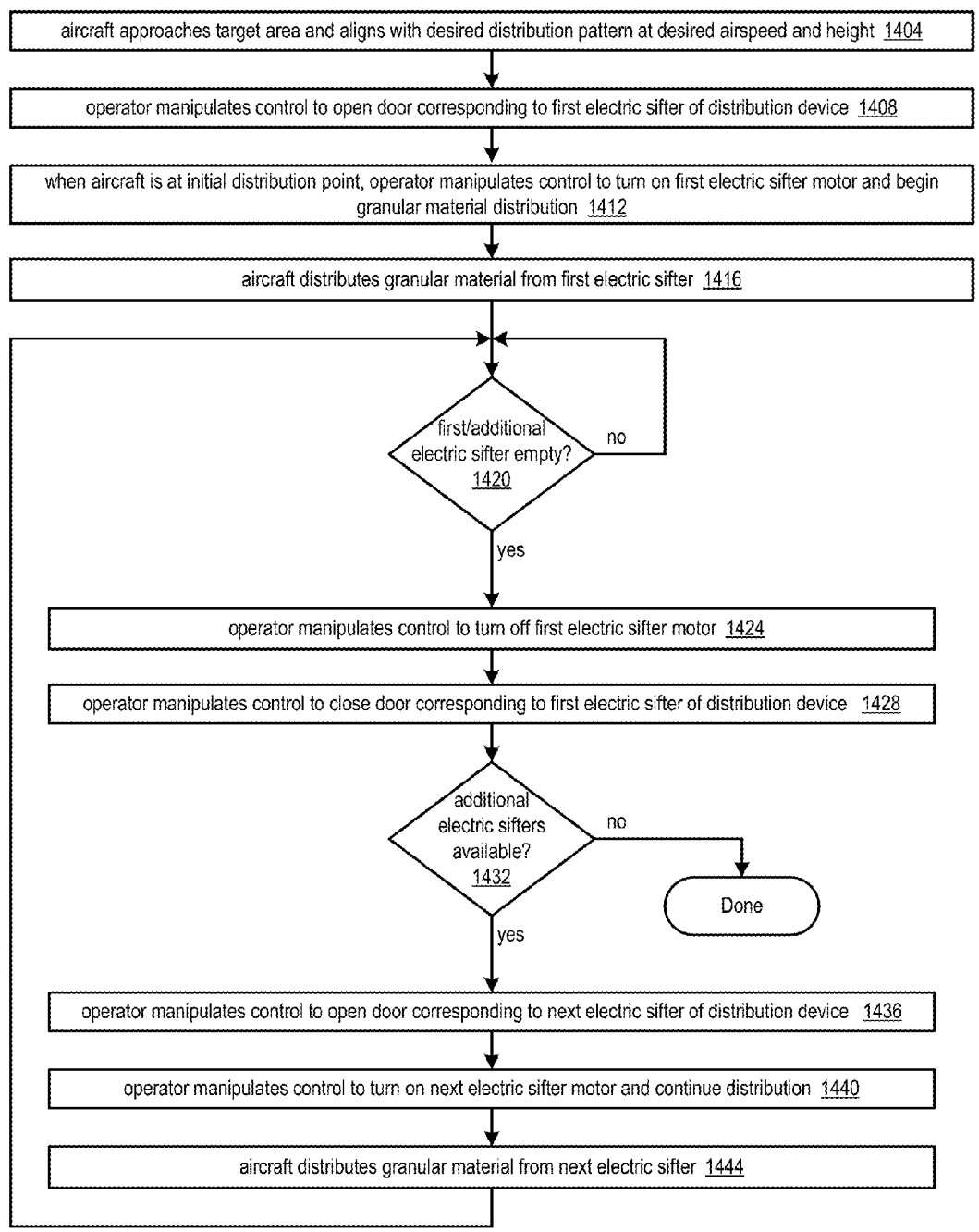
Fig. 14 granular material distribution process

*Fig. 15 beneficial insect distribution process*

```
┌─────────────────────────────────────────────────────────────────────────────────────────┐
│ aircraft approaches target area and aligns with desired distribution pattern at desired airspeed and height 1504 │
└─────────────────────────────────────────────────────────────────────────────────────────┘
                                              ↓
┌─────────────────────────────────────────────────────────────────────────────────────────┐
│                        aircraft reaches initial distribution point 1508                  │
└─────────────────────────────────────────────────────────────────────────────────────────┘
                                              ↓
┌─────────────────────────────────────────────────────────────────────────────────────────┐
│ operator manipulates control to open door corresponding to first chamber of multiple chamber distribution device or first │
│                                   distribution device 1512                               │
└─────────────────────────────────────────────────────────────────────────────────────────┘
                                              ↓
┌─────────────────────────────────────────────────────────────────────────────────────────┐
│ aircraft distributes beneficial insects from first chamber of multiple chamber distribution device or first distribution device │
│                                             1516                                         │
└─────────────────────────────────────────────────────────────────────────────────────────┘
                                              ↓
                                     ╱first/next chamber╲        no
                                    ╱ or first/next distribution╲─────┐
                                    ╲   device empty? 1520      ╱     │
                                     ╲                         ╱      │
                                              ↓ yes                   │
┌─────────────────────────────────────────────────────────────────────────────────────────┐
│ operator manipulates control to close door corresponding to first chamber of multiple chamber distribution device │
│                       or a door of the first distribution device 1524                    │
└─────────────────────────────────────────────────────────────────────────────────────────┘
                                              ↓
                                      ╱  additional  ╲      no
                                     ╱ chambers or distribution ╲─────→ ( Done )
                                     ╲  devices available?      ╱
                                      ╲       1528             ╱
                                              ↓ yes
┌─────────────────────────────────────────────────────────────────────────────────────────┐
│ operator manipulates control to open door corresponding to next chamber of multiple chamber distribution device │
│     or door of next distribution device of multiple distribution devices, and continue distribution 1532 │
└─────────────────────────────────────────────────────────────────────────────────────────┘
                                              ↓
┌─────────────────────────────────────────────────────────────────────────────────────────┐
│ aircraft distributes beneficial insects from next chamber of multiple chamber distribution device or next │
│                 distribution device of multiple distribution devices 1536               │
└─────────────────────────────────────────────────────────────────────────────────────────┘
```

AERIAL GRANULAR MATERIAL DISTRIBUTION DEVICE

CROSS REFERENCE TO RELATED APPLICATIONS

This application is a Divisional of pending non-Provisional U.S. application Ser. No. 13/784,469 filed Mar. 4, 2013, entitled AERIAL MATERIAL DISTRIBUTION APPARATUS, which is hereby incorporated by reference for all purposes. This application is related to pending non-Provisional U.S. application Ser. No. 14/597,018, filed Jan. 14, 2015, entitled AERIAL BENEFICIAL INSECT DISTRIBUTION VEHICLE.

FIELD

The present invention is directed to methods and apparatuses for aerial distribution of material. In particular, the present invention is directed to methods and apparatuses for efficiently distributing granular materials and beneficial insects by aerial means.

BACKGROUND

Crop dusting, or aerial top dressing, involves spraying crops with fertilizers, pesticides, and fungicides from an agricultural aircraft. Agricultural aircraft are often purpose built, and include fixed wing airplanes and helicopters. In most cases, the fertilizers, pesticides, and fungicides are applied in liquid form from a spraying apparatus affixed to the crop dusting aircraft. The spraying apparatus includes wet tanks which store the applied liquids, pressurization apparatus to transfer the applied liquids from the wet tanks to a spray boom, and spray nozzles arranged approximately symmetrically along the spray boom and oriented in a downward direction. Controls are provided near the pilot to control the release of the applied liquids to a selected target area. In most cases, the selected target area is a concentration of several acres of plants or trees such as an orchard or plowed field.

SUMMARY

The present invention is directed to solving disadvantages of the prior art. In accordance with embodiments of the present invention, an aircraft for distributing granular material on a target area is provided. The aircraft includes an electric sifter, which includes a motor to distribute the granular material on the target area and a screen on the bottom surface of the electric sifter. The screen allows the granular material to pass through the screen to the target area. The aircraft also includes a circuit to activate the motor, one or more power sources to power the motor and the circuit, and an interface for an operator to control the circuit. The granular material is stored in the electric sifter. The operator manipulates the interface to signal the circuit to activate the motor. The electric sifter distributes the granular material when the motor is activated.

In accordance with other embodiments of the present invention, a device for distributing granular material to a target area from an aircraft is provided. The device includes one or more electric sifters. The granular material is stored in the one or more electric sifters, each of the one or more electric sifters includes a motor to distribute the granular material on the target area and a screen on the bottom surface of the electric sifter, the screen including one of a first portion and a first portion and a second portion. The first portion allows the granular material to pass through the screen to the target area, and the second portion prevents the granular material from passing through the screen. The device also includes a circuit to control the motors, one or more power sources to power the motors and the circuit, and an interface for a human operator to control the circuit.

In accordance with still other embodiments of the present invention, a remotely-piloted aircraft for distributing beneficial insects on a target area is provided. The remotely-piloted aircraft includes an enclosure, which includes a top lid covering the top of the enclosure, one or more internal compartments to store the beneficial insects, a door for each of the one or more internal compartments, and an actuator to open and close each of the doors. The remotely-piloted aircraft also includes a circuit to control the actuators, a wireless receiver, coupled to the circuit, to receive commands to open and close the doors, and one or more power sources to power the actuators and the wireless receiver. An operator controls the aircraft and the circuit with at least one of a wireless transmitter and an uploaded program in the circuit. When the wireless receiver receives a command to open a door, the circuit controls an actuator corresponding to the door. The actuator opens the door, and the beneficial insects are distributed from internal compartments when the corresponding door is open.

One advantage of the present invention is it provides an effective means for distribution of granular material to a target area, especially where the distribution area is not in close proximity to the ground. Conventional ground-based granular material applicators requires blowers and in some cases ladders to reach the distribution area, and are therefore much slower in application than aerial granular material distribution apparatuses.

Another advantage of the present invention is that a conventional crop-dusting airplane or helicopter can be modified to use the present invention. Liquid material distribution apparatuses on the airplane or helicopter do not need to be removed, and in fact provide convenient means to attach the granular material distribution apparatus. Therefore, the same airplane or helicopter can be used for both liquid and granular material distribution.

Another advantage of the present invention is it takes advantage of existing flight characteristics of the distributing aircraft to efficiently distribute granular material. The forward airspeed of conventional airplanes and helicopters carry granular material through the bottom and back of granular material distribution enclosures to distribute the material on the target area. The forward flight of conventional airplanes and nose-down forward flight of conventional helicopters allow granular material in the electric sifters to gather and settle next to the first portion of the screen, which mitigates pauses in distribution due to granular material settling in the electric sifters during distribution. The rotor wash of helicopters beneficially provides a down force to distribute granular material in the target area.

Yet another advantage of the present invention is it minimizes damage to beneficial insects when a remotely-piloted rotorcraft is being used to distribute the beneficial insects. Conventional airplanes have a forward airspeed considerably higher than helicopters, and must fly above a stall speed in order to remain airborne. Conventional helicopters at all times while airborne produce significant downward turbulence from rotor wash. The airplane airspeed and helicopter rotor wash may damage delicate wings of beneficial insects, resulting in ineffective application of beneficial insects. Remotely-piloted rotorcraft produce less air turbulence than conventional helicopters or airplanes, thus allowing safe release of beneficial insects.

Additional features and advantages of embodiments of the present invention will become more readily apparent from the following description, particularly when taken together with the accompanying drawings.

BRIEF DESCRIPTION OF THE DRAWINGS

FIG. 1a is a diagram illustrating components of a granular material dispersal system using an airplane in accordance with embodiments of the present invention.

FIG. 1b is a diagram illustrating an airplane side view in accordance with embodiments of the present invention.

FIG. 2a is a diagram illustrating components of a granular material dispersal system using a helicopter in accordance with embodiments of the present invention.

FIG. 2b is a diagram illustrating a helicopter side view in accordance with embodiments of the present invention.

FIG. 3a is a diagram illustrating a front isometric view of an enclosure without electric sifters in accordance with embodiments of the present invention.

FIG. 3b is a diagram illustrating a side view of an enclosure containing electric sifters with lid and door open in accordance with embodiments of the present invention.

FIG. 4a is a diagram illustrating a side view of a mounted enclosure containing an electric sifter with lid closed and door closed in accordance with embodiments of the present invention.

FIG. 4b is a diagram illustrating a side view of a mounted enclosure containing an electric sifter with lid closed and door open in accordance with embodiments of the present invention.

FIG. 5a is a diagram illustrating a door detail without flange in accordance with embodiments of the present invention.

FIG. 5b is a diagram illustrating a door detail with flange in accordance with embodiments of the present invention.

FIG. 6 is a diagram illustrating details of an electric sifter in accordance with a first embodiment of the present invention.

FIG. 7 is a diagram illustrating details of an electric sifter in accordance with a second embodiment of the present invention.

FIG. 8a is a diagram illustrating a sifter screen in accordance with a first embodiment of the present invention.

FIG. 8b is a diagram illustrating a sifter screen in accordance with a second embodiment of the present invention.

FIG. 9a is a block diagram illustrating a granular material dispersal apparatus in accordance with a first embodiment of the present invention.

FIG. 9b is a block diagram illustrating a granular material dispersal apparatus in accordance with a second embodiment of the present invention.

FIG. 10a is a block diagram illustrating a circuit using wired control in accordance with embodiments of the present invention.

FIG. 10b is a block diagram illustrating a circuit using wireless control in accordance with embodiments of the present invention.

FIG. 11 is a diagram illustrating a remotely piloted aircraft in accordance with embodiments of the present invention.

FIG. 12 is a diagram illustrating a beneficial insect distribution device in accordance with embodiments of the present invention.

FIG. 13a is a diagram illustrating an inside surface of a beneficial insect distribution device lid in accordance with embodiments of the present invention.

FIG. 13b is a diagram illustrating an inside bottom surface of a beneficial insect distribution device in accordance with embodiments of the present invention.

FIG. 14 is a flowchart illustrating a granular material distribution process in accordance with embodiments of the present invention.

FIG. 15 is a flowchart illustrating a beneficial insect distribution process in accordance with embodiments of the present invention.

DETAILED DESCRIPTION

In some cases, it is desirable to apply materials in solid form to plants and trees. In some cases, a blower or brush operated by a ground-based applicator is used to blow the solid material onto targeted plants or trees. This may be suitable for plants or trees in close proximity to the ground, but such a distribution apparatus may not be able to reach taller plants or trees. Many such plants or trees, such as avocado trees, can grow to heights of 20 feet or more. Additionally, flowers of such trees are often concentrated in the canopy at the top of the trees, facing toward the sun. Although bees are commonly used to pollinate flowers, if bees are not available, then other means must be found to pollinate flowers on beneficial plants and trees. For example, in late 2006 many honeybee colonies experienced Colony Collapse Disorder (CCD), where worker bees abruptly disappeared.

It is desirable to apply pollen and other granular solids to plants and trees more efficiently than a ground-based blower or brush can provide. Normally, it is recommended to apply approximately 20 grams of pollen to an acre of trees. It is highly desirable to use existing crop-dusting aircraft to apply granular solids since new crop-dusting aircraft can be very expensive. Additionally, certain forms of aircraft can be used to apply beneficial insects to an area in order to control populations of harmful insects. The present invention is directed to providing reliable means of aerially distributing granular solids and beneficial insects to a selected target area.

Referring now to FIG. 1*a*, a diagram illustrating components of a granular material dispersal system using an airplane 104 is shown. Airplane 104 is a conventional fixed-winning airplane used for crop-dusting and/or beneficial insect release, and is suitable for low altitude operation. Although airplane 104 is illustrated as a high-wing aircraft, any sort of suitable aircraft including low-wing monoplanes may be used.

Airplane 104 includes a spray boom 108, used for distributing liquids to plants and trees. Airplane 104 is modified by adding one or more enclosures 112 for distributing granular material 124 to a given target area 116. Enclosures 112 are described in more detail in FIGS. 3-8, and include one or more electric sifters. However, in some embodiments, enclosures 112 are not present, and only electric sifters and associated support apparatus are present. However, enclosures 112 represent the preferred embodiment when a fixed-wing airplane 104 is performing the granular material 124 distribution.

When used for pollen distribution, granular material 124 includes pollen or a pollen mixture to be distributed on flowers 120 within the target area 116. A pollen mixture may be from 1:1 part of pollen to cornstarch/Sureset to 1:3. Cornstarch and/or Sureset are a carrier for the pollen, and add beneficial weight that aids in pollen distribution. Although FIG. 1*a* illustrates granular material 124 distributed by a single enclosure 112, it should be understood that granular material 124 may be distributed by any number of enclosures 112, including all enclosures 112 on airplane 104. Additionally, granular material 124 may include any material in powder or granular form, including but not limited to pesticides, fungicides, and fertilizers.

The target area 116 includes fields, orchards, farms, and any other area that granular material 124 is to be distributed on. In some embodiments, including pollen distribution, the target area 116 includes flowers 120. However in other embodiments flowers 120 are not present.

Referring now to FIG. 1b, a diagram illustrating an airplane 104 side view in accordance with embodiments of the present invention is shown. Airplane 104 includes spray boom 108 and one or more enclosures 112. As illustrated in FIG. 1b, enclosures 112 are mounted at an angle to spray boom 108. Angled mounting of enclosures 112 provides optimal operation for the present invention when coupled to an airplane 104, and will be described in more detail with respect to FIGS. 4a and 4b.

Referring now to FIG. 2a, a diagram illustrating components of a granular material 124 dispersal system using a helicopter 204 in accordance with embodiments of the present invention is shown. Helicopter 204 is a rotary-wing aircraft capable of low-speed flying and hovering. Helicopter 204 includes a spray boom 108 as well as one or more enclosures 112. Helicopter 204 may also include one or more wet tanks 212; however these are not used in the present invention and are used for liquid distribution from spray boom 108. Unlike airplane 104, helicopter 204 produces rotor wash 208 below the spinning rotor in a downward direction. When granular material 124 includes pollen, rotor wash 208 aids in distributing the pollen on flowers 120 in the target area 116. Although FIG. 2a illustrates granular material 124 distributed by a single enclosure 112, it should be understood that granular material 124 may be distributed by any number of enclosures 112, including all enclosures 112 on helicopter 204.

Referring now to FIG. 2b, a diagram illustrating a helicopter 204 side view in accordance with embodiments of the present invention is shown. Helicopter 204 includes a spray boom 108 and one or more enclosures 112. As illustrated in FIG. 2b, enclosures 112 are not mounted at an angle to spray boom 108. Straight mounting of enclosures 112 provides optimal operation for helicopter 204 applications of the present invention, and will be described in more detail with respect to FIGS. 4a and 4b.

In the preferred embodiment, airplane 104 and helicopter 204 are able to apply the granular material 124 to 20 to 40 acres of target area 116 without restocking the granular material 124 on the airplane 104 or helicopter 204.

Referring now to FIG. 3a, a diagram illustrating a front isometric view of an enclosure 112 without electric sifters 328 in accordance with embodiments of the present invention is shown. Enclosure 112 is a box containing a top lid 304 and one or more bottom doors 320. Top lid 304 is used to add granular material 124 to enclosure 112. Bottom doors 320 are used to distribute granular material 124 to the target area 116. Therefore, the top lid 304 is used when the airplane 104 or helicopter 204 is on the ground and being readied for granular material 124 distribution operations, and the bottom doors 320 are used when the airplane 104 or helicopter 204 is aerially distributing the granular material 124. In the preferred embodiment, top lid 304 is hinged to enclosure 112 with a piano hinge 324, and when closed the top lid 304 is secured to the enclosure 112 with Velcro. The piano hinge 324 may hinge at either the enclosure front 308 or the enclosure rear 316. In other embodiments, piano hinge 324 is not present and top lid 304 is attached to enclosure 112 through other types of fasteners.

Enclosure 112 includes enclosure sides 312a, 312b, enclosure front 308, and enclosure rear 316. In the preferred embodiment, enclosure 112 is constructed from aluminum sheet. In other embodiments, enclosure 112 may be constructed from sheet steel, fiberglass, or various polymers or composites known in the art—including high-density polyethylene (HDPE). It should be understood that enclosure 112 may be subjected to significant vibration from engines, wind, and motors 604 used for granular material 124 distribution. Therefore, the materials and fasteners used to construct enclosure 112 must be able to withstand expected vibrations in the aerial distribution application. Enclosure front 308 is attached to spray boom 108 using clamps or other forms of mechanical attachment known in the art appropriate for the application.

Referring now to FIG. 3b, a diagram illustrating a side view of an enclosure 112 containing one or more electric sifters 328 with lid 304 and bottom door 320 open in accordance with embodiments of the present invention is shown. When mounted to a spray boom 108, enclosure 112 requires remotely controlled apparatus to control aerial distribution of granular material 124.

An actuator 332 and corresponding bottom door 320 is provided for each electric sifter 328 in the enclosure 112. Actuator 332 controls a door control rod 336 flexibly connected to bottom door 320 through a flexible coupling 340. When actuator 332 is in a retracted or up position, door control rod 336 is pulled upward, closing bottom door 320. When actuator 332 is in an extended or down position, door control rod 336 is pushed downward, opening bottom door 320. Although not required in all embodiments, bottom door 320 keeps granular material 124 within enclosure 112 until such time as bottom door 320 is opened by actuator 332.

Actuator 332 may be any suitable actuator for extending and retracting door control rod 336, including servos, solenoids, hydraulic actuators, magnetic actuators, and air or gas pressure actuators 332. Door control rod 336 is any rigid or semi-rigid lightweight rod that maintains approximate shape during any movement of door control rod 336, including aluminum, steel, or synthetic rods. Flexible coupling 340 moves in response to drawer control rod 336 movement, and allows door control rod 336 to exert normal force to bottom door 320 whether opening or closing bottom door 320. Bottom door 320 is hinged to enclosure 112 by door piano hinge 344 in order to allow bottom door 320 to open and close near the rear lower edge of enclosure 112.

Referring now to FIG. 4a, a diagram illustrating a side view of a mounted enclosure 404 containing an electric sifter 328 with lid 304 closed and door closed 320a in accordance with embodiments of the present invention is shown. Mounted enclosure 404 includes enclosure 112 mounted to spray boom 108. Since spray boom 108 is also used for application of suitable liquids by aerial dispersal, spray boom 108 includes a plurality of spray nozzles 408. Spray nozzles 408 are approximately evenly distributed along spray boom 108, and are typically not used during application of granular material 124.

FIG. 4a illustrates enclosure 112 mounted at an angle to spray boom 108 when an airplane 104 is used for distribution of granular material 124. Since airplane 104 is forward during level flight 412, it is necessary to mount enclosure 128 to spray boom 108 at an angle in order to facilitate distribution of granular material 124. As will be discussed in more detail with respect to FIGS. 8a and 8b, granular material 124 passes through the first portion of the screen 804—which is oriented toward the enclosure front 308 adjacent to the spray boom 108. However, for applications where a helicopter 204 is used to distribute the granular material 124, enclosure 112 is not mounted at an angle as shown in FIGS. 4*a* and 4*b*. Instead, enclosure 112 is mounted straight as illustrated in FIG. 2*b*. The reason for this is that in forward flight 412, the helicopter 204 is oriented nose-down and tail-up. This orientation tilts the enclosure 112 so that in forward flight, enclosure 112 is angled appropriately and the granular material 124 is efficiently distributed. Regardless of the type of aircraft 104, 204, the enclosure 112 should be mounted 404 such that it is tilted as illustrated in FIG. 4*a*, 4*b* when the aircraft 104, 204 is in forward flight. FIG. 4*a* also illustrates actuator 332*a* in the retracted position, where the bottom door 320*a* is in the closed position 320.

Referring now to FIG. 4*b*, a diagram illustrating a side view of a mounted enclosure 404 containing an electric sifter 328 with lid 304 closed and door open 320*b* in accordance with embodiments of the present invention is shown. FIG. 4*b* illustrates a mounted enclosure 404 during the time the granular material 124 is being distributed. Actuator 332*b* is in an extended position, causing door control rod 336 to position bottom door 320*b* in an open position. Since bottom door 320*b* is hinged by door piano hinge 344, it is necessary to provide door cutouts as shown in FIGS. 5*a* and 5*b*. Otherwise, air movement 420 would be blocked and not able to distribute granular material 124.

In the preferred embodiment illustrated in FIG. 4*b*, bottom door 320*b* has a flange 416 to guide air movement 420 between the bottom of mounted enclosure 404 and the top surface of bottom door 320*b*. The flange 416 is described in more detail with respect to FIG. 5*b*. Granular material 124 is dispersed in direction 424 from mounted enclosure 404.

Referring now to FIG. 5*a*, a diagram illustrating a door detail without flange 320*a* in accordance with embodiments of the present invention is shown. Bottom door 320*a* is formed from a flat section of sheet aluminum, steel, or a rigid synthetic material, including high density polyethylene (HDPE). The front portion of bottom door 320*a* is attached to enclosure 112 through a pair of door piano hinges 344. Door piano hinges 344 allow bottom door 320*a* to pivot away from enclosure 112 when distributing granular material 124. Each door piano hinge 344 has one or more mounting holes 508. Any suitable fastener such as rivets or machine screws may fasten door piano hinges 344 to bottom door 320*a* enclosure 112.

Bottom door 320*a* has a cutout 504 along the front edge bottom door 320*a* to provide space through which air movement 420 is admitted, as discussed with respect to FIG. 3*b*. The size and shape of cutout 504 depends on the airspeed at which airplane 104 or helicopter 204 distributes the granular material 124. In the preferred embodiment, the cutout is approximately 3½ inches wide at the front edge of bottom door 320 and approximately 1¾ inches deep.

Referring now to FIG. 5*b*, a diagram illustrating a door detail with flange 320*b* in accordance with embodiments of the present invention is shown. Bottom door 320*b* is an improvement over bottom door 320*a* since a flange 416 is provided as an air scoop to more efficiently move air 420 into proximity with granular material 124 being distributed. Although many shapes and mounting arrangements may be provided for flange 416, a simple arrangement is illustrated in FIG. 5*b*.

In one embodiment, flange 416 is part of the same sheet of material as bottom door 320*b*, and is bent at approximately a 45° angle to bottom door 320*b* at bend line 512. In this case, two separate cutouts 516 are provided, one symmetrically on each side of flange 416. If the material used to fabricate bottom door 320*b* does not allow for flange 416 to be bent from the same material as the rest of bottom door 320*b*, then flange 416 may be fabricated from a different sheet of material or different type of material as the rest of bottom door 320*b*, and permanently attached to bottom door 320*b* by a suitable method. In this case, cutout 516 may be the same shape and size as cutout 504 illustrated in FIG. 5*a*.

Referring now to FIG. 6, a diagram illustrating details of an electric sifter 328*a* in accordance with a first embodiment of the present invention is shown. Electric sifter 328*a* is a modified form of a handheld device commonly used for sifting flour and other baking powders. Prior to modification, electric sifter 328*a* includes an activation switch, one or more batteries, and an electric motor 604. In the preferred embodiment, the electric sifter 328*a* is a Norpro electric sifter with a handle-mounted motor 604 that holds between 300 and 500 grams of the granular material 124. Electric sifter 328*a* is intended for mounting within an enclosure 112 mounted on an airplane 104 or helicopter 204, where the enclosure 112 is equipped with a bottom door 320 for each electric sifter 328*a* within the enclosure 112.

Electric sifter 328*a* is initially modified by removing the activation switch and batteries from the electric sifter 328*a* handle. Motor control wires 608 from the motor 604 are extended and routed through the hole where the activation switch used to be. Electric sifter 328*a* has a screen 624 through which granular material 124 are sifted when the motor 604 is activated. The screen 624 is modified as shown in FIGS. 8*a* and 8*b*. Granular material is added 612 to electric sifter 328*a* through the open top of electric sifter 328*a*.

In order to facilitate reliable distribution of granular material 124, one or more springs 620 are added to the interior sides of electric sifter 328*a*. Springs 620 sympathetically vibrate with screen 624 movement when the motor 604 is operating. The sympathetic vibration causes the granular material 124 to settle at the lowest point within electric sifter 328*a*, resulting in uninterrupted and even distribution of granular material 124 from the electric sifter 328*a* when the motor 604 is activated. Springs 620 are installed in such a way to not interfere with the sifting action provided by the motor 604. In the preferred embodiment, the springs 620 are made from a corrosion resistant material such as stainless steel, and are under loose tension allowing free vibration.

In a preferred embodiment, one or more sonar or optical sensors 616 are installed within a top inside surface of electric sifter 328*a*, in order to detect when the level of granular material 124 within the electric sifter 328*a* is at or near the bottom of the electric sifter 328*a*. Sonar or optical sensor 616 provides a granular material level sensor output 628 to the circuit 908. When the circuit 908 detects the presence of the granular material level sensor output 628, the circuit 908 provides feedback to an operator or application program so that an operator or application program may take appropriate action, including inactivating motor 604, closing a door 320 corresponding to the electric sifter 328*a*, activating a motor 604 of a different electric sifter 328, opening a door 320 corresponding to the different electric sifter 328, or guiding an aircraft 104, 204, 1104 in a different direction such as to an airport or landing strip to refill granular material 124 in the electric sifters 328. In lieu of sonar or optical sensors 616, the operator may visually check for the presence of granular material 124 being distributed by the aircraft 104, 204, 1104. In some embodiments, the aircraft pilot is the operator. In other embodiments, a different individual is the operator.

Referring now to FIG. 7, a diagram illustrating details of an electric sifter 328*b* in accordance with a second embodiment of the present invention is shown. Electric sifter 328*b* is of a more compact arrangement than electric sifter 328*a*. The motor 604 is within a housing 704 centered within the lower portion of electric sifter 328*b*. After removing a handle containing an activation switch and batteries, motor control wires 608 are routed outside of electric sifter 328*b* to a circuit 908. In the preferred embodiment, electric sifter 328*b* is a Norpro Model 104 battery-operated electric sifter. In the preferred embodiment, electric sifter 328*b* is intended for mounting beneath a remotely-piloted aircraft 1104, as illustrated in FIG. 11.

A top lid 712 is fabricated out of High-density polyethylene (HDPE). The top lid 712 in some embodiments as a sonar or optical sensor 616 attached to the bottom surface of the top lid 712, and the granular material level sensor output 628 is routed through a hole in the top lid 712. The top lid 712 is coupled to the housing 704 of the electric sifter 328*b* by a lid spring 708. The lid spring 708 provides spring force 716 to push the top lid 712 from the top surface of the electric sifter 328*b*. Therefore, when the top lid 712 is attached to the electric sifter 328*b*, the lid spring 708 is in compression and tabs in the top lid 712 remain engaged in mating slots near the top of the electric sifter 328*b*.

In order to add granular material 124 to the electric sifter 328*b*, the electric sifter 328*b* is disengaged from the top lid 712 and the granular material 124 is poured in through the top of the electric sifter 328*b*. Electric sifter 328*b* has a screen 624 on the bottom surface of the electric sifter 328*b*.

Referring now to FIG. 8*a*, a diagram illustrating a sifter screen 624*a* in accordance with a first embodiment of the present invention is shown. Sifter screen 624*a* includes a screen first portion 804*a* and a screen second portion 808*a*. In the first embodiment, the screen first portion 804*a* is a pie-shaped section and is oriented toward the front of the aircraft 816.

The screen first portion 804*a* is a wire mesh screen of sufficient size to allow individual granules of granular material 124 to pass through holes of the screen first portion 804*a*. For example, when the granular material 124 is pollen mixed with cornstarch and/or Sureset, it will have different flow characteristics than flour or baking powders due to different moisture content and granule size. In the preferred embodiment, a screen of 6 to 8 meshes (6 to 8 regularly-spaced openings per inch) is used for the screen first portion 804*a*.

The screen second portion 808*a* is a finer pitched portion of screen 624*a* than the screen first portion 804*a*, and prevents passage of the granular material 124 through the screen second portion 808*a*. For example, when the granular material 124 is pollen mixed with cornstarch and/or Sureset, the screen second portion 808*a* can be the remaining portion of the original screen 624*a* provided with the unmodified electric sifter 328. In the preferred embodiment, the screen first portion 804*a* has less area then the screen second portion 808*a*, and a screen of 20 to 22 meshes is used for the screen second portion 808*a*.

In order to attach the screen first portion 804*a* to the screen second portion 808*a*, safety wire 812 is used. Safety wire 812 is any suitable flexible wire that may attach screen first portion 804*a* to screen second portion 808*a* and resist corrosion. In the preferred embodiment, safety wire 812 is 0.032 thick solid stainless steel wire.

Referring now to FIG. 8*b*, a diagram illustrating a sifter screen 624*b* in accordance with a second embodiment of the present invention. Sifter screen 624*b* includes a screen first portion 804*b* and a screen second portion 808*b*. In the second embodiment, the screen first portion 804*b* is front linear section and is oriented toward the front of the aircraft 816. The size of the screen first portion 804*b* may be about a minimum of 10% of the screen 624*b*, and in the preferred embodiment is about ⅓ of the total area of the screen 624*b*. In the preferred embodiment, a screen of 6 to 8 meshes (6 to 8 regularly-spaced openings per inch) is used for the screen first portion 804*b*.

The screen first portion 804*b* is a wire mesh screen of sufficient size to allow individual granules of granular material 124 to pass through holes of the screen first portion 804*b*. For example, when the granular material 124 is pollen mixed with cornstarch and/or Sureset, it will have different flow characteristics than flour for baking powders due to different moisture content and granule size.

The screen second portion 808*b* is a finer pitched portion of screen 624*b* than the screen first portion 804*b*, and prevents passage of the granular material 124 through the screen second portion 808*b*. For example, when the granular material 124 is pollen mixed with cornstarch and/or Sureset, the screen second portion 808*b* can be the remaining portion of the original screen 624*b* provided with the unmodified electric sifter 328. In the preferred embodiment, a screen of 20 to 22 openings per inch is used for the screen second portion 808*b*.

In order to attach the screen first portion 804*b* to the screen second portion 808*b*, safety wire 812 is used. Safety wire 812 is any suitable flexible wire that may attach screen first portion 804*b* to screen second portion 808*b* and resist corrosion. In the preferred embodiment, safety wire 812 is 0.032 thick solid stainless steel wire.

The size of the screen first portion 804*a*, 804*b* relative to the total size of the screen 624*a*, 624*b* is related to forward airspeed and flow rate of the granular material 124 through the screen first portion 804*a*, 804*b*. In the preferred embodiment, the screen first portion 804*a*, 804*b* is approximately ⅓ of the total area of the screen 624, for a forward airspeed of about 40 miles per hour. That corresponds to all granular material 124 being distributed from an electric sifter 328 in about 35-50 seconds. For a faster forward airspeed than 40 miles per hour, the area of the screen first portion 804*a*, 804*b* should be increased above ⅓ of the total area of screen 624*a*, 624*b*. For a slower forward airspeed than 40 miles per hour, the area of the screen first portion 804*a*, 804*b* should be decreased below ⅓ of the total area of screen 624*a*, 624*b*.

It should be noted that the shape, size, and orientation of the screen first portion 804*a*, 804*b* and screen second portion 808*a*, 808*b* may be different than illustrated in FIGS. 8*a* and 8*b* without deviating from the scope of the present invention. Additionally, the screen second portion 808*a*, 808*b* may be a solid section of metal or synthetic plate and not a screen mesh made of interwoven wires as illustrated. The screen second portion 808*a*, 808*b* is intended to block passage of the granular material 124 through the screen 624*a*, 624*b*—therefore, a solid section of metal or synthetic plate would suffice for that purpose.

Referring now to FIG. 9*a*, a block diagram illustrating a granular material 124 dispersal apparatus in accordance with a first embodiment of the present invention is shown. The granular material 124 dispersal apparatus includes an operator interface 904*a*, which allows an operator to control the motor 916 and an actuator 920, if present. The operator interface 904*a* in some embodiments receives feedback that a sonar or optical sensor 616 indicates a sifter empty condition 928. Although only one motor on/off control 916, door open/close control 920, and sifter empty indication 928 is illustrated in FIG. 9*a*, it should be understood that a set of each control 916, 920 and indication 928 would normally be provided for each electric sifter 328 and bottom door 320 on the aircraft 104, 204, 1104.

Operator interface 904*a* is coupled to a circuit 908*a*, which generates actuator control 924 to an actuator 332 and motor control 608 to a motor 604 of an electric sifter 328. Circuit 908a also receives a granular material level sensor output 628 from a sonar or optical sensor 616 of the electric sifter 328, and responsibly generates sifter empty indication 928 to the operator interface 904a. The embodiment illustrated in FIG. 9a would be commonly used where the distributing aircraft is an airplane 104 or helicopter 204, where cable assemblies interconnect the operator interface 904a to the circuit 908a.

Circuit 908a receives power from one or more power sources 912. Power sources 912 provide one or more forms of DC power 936 to circuit 908a. In one embodiment, power sources 912 provide +5 Volts DC and +1.5 Volts DC to circuit 908a from battery sources. In other embodiments, power sources 912 convert other AC or DC power of airplane 104 or helicopter 204 into required DC voltages to operate circuit 908a.

Referring now to FIG. 9b, a block diagram illustrating a granular material 124 dispersal apparatus in accordance with a second embodiment of the present invention is shown. FIG. 9b is similar to FIG. 9a with the exception of a wireless connection between the operator interface 904b and the circuit 908b. Specifically, the operator interface 904b is a wireless transceiver capable of sending and/or receiving wireless motor and door control commands and sifter empty indication 932 to and from circuit 908b.

The embodiment illustrated in FIG. 9b could be used in conjunction with aircraft 104 or helicopter 204 to eliminate control wiring between the operator interface 904b and the circuit 908b, especially when the circuit 908b is located away from the operator and in proximity to any of enclosures 112 on the aircraft. The embodiment illustrated in FIG. 9b would be the preferred embodiment when the aircraft is a remotely piloted aircraft 1104 as illustrated and described with respect to FIG. 11. Enclosure 112 and sonar or optical sensor 616 is illustrated using dashed lines to indicate optional inclusion in FIGS. 9a and 9b.

Referring now to FIG. 10a, a block diagram illustrating a circuit 908a using wired control in accordance with embodiments of the present invention is shown. The embodiment illustrated in FIG. 10a corresponds to the block diagram illustrated in FIG. 9a.

Operator interface 904a includes switches for each motor on/off, each door open/closed, and optionally each sifter empty indication. Circuit 908a includes a motor relay 1008 for each motor 604, and an actuator relay 1012 for each actuator 332. Motor relays 1008 are controlled by motor on/off of operator interface 904a, and motor relay power is provided by DC power 936 from power sources 912. Each motor relay 1008 produces a corresponding motor control 608 to each motor 604.

Actuator relays 1012 are controlled by door open/closed of operator interface 904a, an actuator relay power is provided by DC power 936 from power sources 912. Each actuator relay 1012 produces a corresponding actuator control 924 to each actuator 332.

Referring now to FIG. 10b, a block diagram illustrating a circuit 908b using wireless control in accordance with embodiments of the present invention is shown. The embodiment illustrated in FIG. 10b represents a considerably more complex control apparatus than the embodiment illustrated in FIG. 10a. Operator interface 904b communicates wireless motor and door control commands and sifter empty indication 928 to/from a wireless transceiver 1020 of circuit 908b.

Wireless transceiver 1020 converts data and commands from wired digital domain commands within circuit 908b into wireless RF data and commands 928. Wireless transceiver 1020 converts wireless motor and door control commands 928 into motor and door control commands 1040 to processor 1024, and activate sifter empty indicator 1044 into wireless sifter empty indication 928 to wireless operator interface 904b.

Circuit 908b includes a CPU, or processor 1024, which executes stored programs in a memory 1028. The stored programs include an operating system 1032 and in some embodiments, an uploaded program 1036. Processor 1024 includes any processing device suitable for executing stored programs, such as Intel x86-compatible processors, embedded processors, mobile processors, and/or RISC processors. Processor 1024 may include several devices including memory controllers, North Bridge devices, and/or South Bridge devices.

Processor 1024 is coupled to memory 1028. Memory 1028 may include both non-volatile memory and volatile memory. The memory 1028 includes firmware which includes an operating system that processor 1024 fetches and executes, including program instructions for the processes of the present invention. Examples of non-volatile forms of memory 1028 include, but are not limited to, flash memory, SD, EPROM, EEPROM, hard disks, and NOVRAM. Volatile forms of memory 1028 stores various data structures and temporary data and variables. Examples of volatile memory 1028 include, but are not limited to, SRAM, DDR RAM, DDR2 RAM, DDR3 RAM, Z-RAM, TTRAM, A-RAM, ETA RAM, and other forms of temporary memory.

In some embodiments, memory 1028 includes an uploaded program 1036. Uploaded program 1036 provides automated control of the motor relays 1008 and actuator relays 1012 under processor 1024 control. For example, processor 1024 may receive aircraft and weather information 1048 from other sensors on the aircraft 104, 204, 1140. Aircraft and weather information 1048 may include any of aircraft speed, position, height, wind speed/direction information, GPS position information, or weather information. Uploaded program 1036 utilizes aircraft and weather information 1048 to determine when to activate and inactivate motor(s) 604 and/or actuator(s) 332. Uploaded program 1036 in some embodiments determines when all granular material 124 has been distributed by the aircraft 104, 204, 1104, or when all electric sifters 328 on the aircraft 104, 204, 1104 are empty. In other embodiments, uploaded program 1036 directs other programs and circuits of the aircraft 1104 to land the aircraft 1104 at a designated location when mission requirements have been met. Mission requirements include granular material 124 has been distributed on all target areas 116, the aircraft 104, 204, 1104 has no more granular material 124 available to distribute, or the aircraft 104, 204, 1104 requires fuel or maintenance.

It should be understood that circuit 908 may be functionally organized in countless different functional organizations and architectures without diverting from the scope or operation of the present invention. Also, it should be noted that the wireless control functionality illustrated in FIGS. 9b and 10b may be used for the simple circuit 908a of FIG. 10a or the complex circuit 908b of FIG. 10b, and the wired control functionality illustrated in FIGS. 9a and 10a may be used for the simple circuit 908a of FIG. 10a or the complex circuit 908b of FIG. 10b.

Referring now to FIG. 11, a diagram illustrating a remotely piloted aircraft 1104 in accordance with embodiments of the present invention is shown. As described herein, the term "aircraft" includes manned airplanes 104 and helicopters 204, in addition to unmanned remotely-piloted aircraft 1104. Remotely-piloted aircraft 1104 may fly under direction of a ground-based operator using a wireless transceiver operator interface 904b, or autonomously or semi-autonomously using an uploaded program 1036.

Although remotely-piloted aircraft 1104 in some embodiments is a remote control fixed-wing airplane or blimp/balloon/glider, in the preferred embodiment the remotely-piloted aircraft 1104 is a rotorcraft such as a remotely-piloted helicopter 1104. In the preferred embodiment, the remotely-piloted aircraft 1104 is a multiple-rotor aircraft such as an Arducopter 3DR Hexa C produced by 3D Robotics and available from http://www.udrones.com, where each of multiple rotors 1108 are outboard from a central chassis 1124.

Remotely-piloted aircraft 1104 includes a remotely-piloted aircraft central control 1112, which controls each of the rotors 1108 and corresponding propulsion motors and sensors on the remotely-piloted aircraft 1104. The sensors may include one or more cameras, airspeed sensors, GPS receivers, altitude sensors, or fuel sensors for the motors controlling each of the rotors 1108.

The remotely-piloted aircraft 1104 includes a remotely-piloted aircraft payload 1120 and a payload power source and relays 1116. Remotely-piloted aircraft payload 1120 may be an electric sifter 328 such as electric sifter 328b illustrated in FIG. 7, or a beneficial insect distribution device 1120 illustrated in FIG. 12. Payload power source and relays 1116 includes power sources 912, circuit 908, and relays 1008 and 1012.

Beneficial insects aid fruit production by limiting or eliminating populations of harmful insects in orchards and areas where crops are being grown. For example, beneficial insects include bees, wasps, predatory mites, and parasitic nematodes.

A remotely-piloted aircraft 1104 has advantages for beneficial insect distribution over conventional airplanes 104 or helicopters 204. Airplanes 104 have a forward airspeed considerably higher than helicopters 204, and must fly above a stall speed in order to remain airborne. Helicopters 204 at all times while airborne produce significant turbulence from rotor wash 208. The higher kinetic energy due to airplane 104 airspeed and helicopter rotor wash 208 may damage delicate wings of beneficial insects, resulting in ineffective application of beneficial insects. The remotely-piloted aircraft 1104 illustrated in FIG. 11 has significantly less kinetic energy—which minimizes air turbulence and allows safer release of beneficial insects.

Referring now to FIG. 12, a diagram illustrating a beneficial insect distribution device 1120 in accordance with embodiments of the present invention is shown. Beneficial insect distribution device 1120 is mounted below a remotely-piloted aircraft 1104, and selectively releases beneficial insects 1256. Although only a single beneficial insect distribution device 1120 is illustrated in FIG. 11, it should be understood that the present invention includes any number of beneficial insect distribution devices 1120 associated with a remotely-piloted aircraft 1104.

Beneficial insect distribution device 1120 includes a lid 1204 and a bottom surface 1208. A center support 1248 provides internal structural integrity between the lid 1204 and the bottom surface 1208. Bottom surface 1208 includes a door 1216 for each chamber 1252. Each door 1216 is individually opened and closed by a control rod 1224 coupled to an actuator 332. Control rods 1224 are rigid members that transfer directional force to each door 1216. Actuators 332 are controlled by circuit 908a, 908b, and power is supplied by battery pack 1240, which is included in power sources 912.

Beneficial insect distribution device 1120 is constructed of a rigid material such as aluminum sheet, steel sheet, or a synthetic material such as ABS plastic or carbon fibers. The beneficial insect distribution device 1120 includes at least one chamber 1252 for storing beneficial insects 1256. In the embodiment illustrated in FIG. 12, four chambers 1252 are present. Each of the chambers 1252 are independent from other chambers 1252 of the same beneficial insect distribution device 1120, and beneficial insects 1256 in one chamber 1252 are prevented from moving to any other chamber 1252. Chambers 1252 are separated from each other by a chamber divider 1260.

Beneficial insect distribution device 1120 as illustrated in FIG. 12 is modified from electric sifter 328b illustrated in FIG. 7. Many of the features discussed herein, such as housing 1220, are present in electric sifter 328b but may not be present in other embodiments. Any suitable device with one or more chambers 1252 and the ability to independently load and distribute beneficial insects 1256 to/from each chamber 1252 is appropriate for use as a beneficial insect distribution device 1120.

Beneficial insect distribution device 1120 includes at least one loading port 1232 for each chamber 1252. Loading ports 1232 are used to add beneficial insects 1244 to chambers 1252. In order to keep loaded beneficial insects 1256 from escaping from a chamber 1252 after being loaded to the chamber 1252, a resilient patch 1236 is placed over loading ports 1232. Resilient patch 1236 in the preferred embodiment is Velcro, but in other embodiments is any material that provides a temporary seal for loading port 1232 such as tape.

In the preferred embodiment, the beneficial insect distribution device 1120 includes one or more vibration motors 604, which are controlled by circuits 908a, 908b, and vibrate structural surfaces of the beneficial insect distribution device 1120 and cause the beneficial insects 1256 to leave the chamber 1252 when the corresponding door 1216 is open. In one embodiment, vibration motor 604 is activated when a door 1216 is open. In another embodiment, vibration motor 604 is activated under operator control 904a, 904b. In the preferred embodiment, vibration motor 604 is a cell phone vibrator.

Referring now to FIG. 13a, a diagram illustrating an inside surface of a beneficial insect distribution device lid 1204 in accordance with embodiments of the present invention is shown. Lid 1204 includes a mounting location for center support 1248, which mechanically couples lid 1204 to bottom surface 1208. Lid 1204 also includes an actuator 332 for each chamber 1252 of the beneficial insect distribution device 1120.

Referring now to FIG. 13b, a diagram illustrating an inside bottom surface 1208 of a beneficial insect distribution device 1120 in accordance with embodiments of the present invention is shown. Bottom surface 1208 includes a door 1216 for each chamber 1252 of the beneficial insect distribution device 1120. Bottom surface 1208 also includes a mounting location for center support 1248, which mechanically couples lid 1204 to bottom surface 1208.

Each door 1216 of the bottom surface 1208 is individually hinged 1308 in order to open any door 1216 separate from any other door 1216. In the preferred embodiment, hinges 1308 are located near the periphery of the bottom surface 1208, and the doors open downward and outward. Each of the control rods 1224 is mechanically coupled to each door 1216 at a control rod attachment point 1304. In the preferred embodiment, a flexible coupling attaches each control rod 1224 to control rod attachment point 1304 in order to allow for door 1216 movement without placing stress on control rods 1224.

Referring now to FIG. 14, a flowchart illustrating a granular material 124 distribution process in accordance with embodiments of the present invention is shown. Prior to the granular material 124 distribution process, in some embodiments it is beneficial to apply a 10% Boron mixture 7 to 10 days before pollination as it helps to prepare flowers 120 to receive a pollen mixture (pollen and cornstarch and/or Sure-set) and time is needed to absorb the material and grow/push the bloom in that direction. The 10% Boron mixture helps to straighten and grow the pollen tube on the flowers 120. The 10% Boron mixture also makes the part of the flowers 120 that becomes the stem stronger—so if there is a larger fruit set, helps the tree hold the fruit.

In some embodiments, the 10% Boron mixture can be applied with a bee attractant, but these are normally applied as a liquid mixture. In the preferred embodiment, the 10% Boron and bee attractant mixture is applied early in the bloom and then starting in mid-bloom, 1-3 applications of the pollen mixture are made. Flow begins at block 1404.

At block 1404, an aircraft 104, 204, 1104 approaches a target area 116 and aligns with a desired distribution pattern at a desired airspeed and height. For example, the aircraft 104, 204, 1104 orients along the edge of a target area 116 and centered within a first strip of the target area 116. Flow proceeds to block 1408.

At block 1408, an operator manipulates a control to open a door 920 corresponding to a first electric sifter 328 of a distribution device 112. The control to open the door 920 corresponding to the first electric sifter 328 causes an actuator relay 1012 to energize, thus providing DC power 936 to an actuator 332 corresponding to a first electric sifter 328. In some embodiments, an enclosure 112 and corresponding door 320 is not present, and this step is skipped. Flow proceeds to block 1412.

At block 1412, when the aircraft 104, 204, 1104 is at the initial distribution point, the operator manipulates a control to turn on a first electric sifter motor 916 and begin granular material 124 distribution. The control to turn on the first electric sifter motor 916 causes a motor relay 1008 to energize, thus providing DC power 936 to a motor 604 of a first electric sifter 328. Flow proceeds to block 1416.

At block 1416, the aircraft 104, 204, 1104 distributes the granular material 124 from the first electric sifter 328. The granular material 124 is distributed to the target area 116. Flow proceeds to decision block 1420.

At decision block 1420, the operator or uploaded program 1036 determines if the first electric sifter 328 is empty. In one embodiment, the operator looks into the top of the first electric sifter 328 to see if it is empty. In another embodiment, a sonar or optical sensor 616 in the first electric sifter 328 generates a granular material level sensor output 628 in response to the first electric sifter 328 being empty or nearly so. The granular material level sensor output 628 generates a sifter empty indication to the operator interface 904. In yet another embodiment, the granular material level sensor output 628 causes the uploaded program 1036 to generate a sifter empty indication to the operator interface 904. In yet another embodiment, the granular material level sensor output 628 causes the uploaded program 1036 to cause a remotely-piloted aircraft 1104 to land at a predetermined location. If the first electric sifter 328 is not empty, then flow proceeds to decision block 1420. If the first electric sifter 328 is empty, then flow proceeds to block 1424.

At block 1424, the operator manipulates a control to turn off the first electric sifter motor 916. The motor 604 of the first electric sifter 328 is inactivated and the first electric sifter 328 does not continue to distribute granular material 124. Flow proceeds to block 1428.

At block 1428, the operator manipulates a control to close the door 920 corresponding to the first electric sifter 328 of the distribution device 112. The control to close the door 920 corresponding to the first electric sifter 328 causes an actuator relay 1012 to de-energize, thus removing DC power 936 from an actuator 332 corresponding to a first electric sifter 328. In some embodiments, an enclosure 112 and corresponding door 320 is not present, and this step is skipped. Flow proceeds to decision block 1432.

At decision block 1432, the operator or uploaded program 1036 determines if additional electric sifters 328, beyond the first electric sifter 328, are available. A given aircraft 104, 204, 1104 may have no, one, or multiple electric sifters 328 available. If no additional electric sifters 328 are available, then flow ends. The aircraft 104, 204, 1104 typically is controlled to return to a predesignated position on the ground to refill the electric sifters 328. If more electric sifters 328 are available, then flow proceeds to block 1436.

At block 1436, the operator manipulates a control to open the door 920 corresponding to the additional electric sifter 328 of the distribution device 112. The control to open the door 920 corresponding to the additional electric sifter 328 causes an actuator relay 1012 to energize, thus providing DC power 936 to an actuator 332 corresponding to the additional electric sifter 328. In some embodiments, an enclosure 112 and corresponding door 320 is not present, and this step is skipped. Flow proceeds to block 1440.

At block 1440, the operator manipulates a control to turn on an additional electric sifter motor 916 and continue granular material 124 distribution. The control to turn on the additional electric sifter motor 916 causes a motor relay 1008 to energize, thus providing DC power 936 to a motor 604 of the additional electric sifter 328. Flow proceeds to block 1444.

At block 1444, the aircraft 104, 204, 1104 distributes the granular material 124 from the additional electric sifter 328. The granular material 124 is distributed to the target area 116. Flow proceeds to decision block 1420, to check if the additional electric sifter 328 is empty.

Referring now to FIG. 15, a flowchart illustrating a beneficial insect 1256 distribution process in accordance with embodiments of the present invention is shown. Flow begins at block 1504.

At block 1504, an aircraft 104, 204, 1104 approaches a target area 116 and aligns with a desired distribution pattern at a desired airspeed and height. For example, the aircraft 104, 204, 1104 orients along the edge of a target area 116 and centered within a first strip of the target area 116. Flow proceeds to block 1508.

At block 1508, the aircraft 104, 204, 1104 is at the initial distribution point, and distribution of beneficial insects 1256 is ready to begin. Flow proceeds to block 1512.

At block 1512, the operator manipulates a control to open a door 1216 corresponding to a first chamber 1252 of a multiple chamber distribution device 1120 or a door 1216 of a first distribution device 1120. Each chamber 1252 of a multiple chamber distribution device 1120 contains a fixed number of beneficial insects 1256, which may only leave the chamber 1252 when the door 1216 is open. Flow proceeds to block 1516.

At block 1516, the aircraft 104, 204, 1104 distributes beneficial insects 1256 from the first chamber 1252 of a multiple chamber distribution device 1120 or a first distribution device 1120. Flow proceeds to decision block 1520.

At decision block 1520, the operator or uploaded program 1036 determines if the first chamber 1252 or the first distribution device 1120 is empty. In one embodiment, the operator looks into the top of the first chamber 1252 or first distribution device 1120 to see if it is empty. In another embodiment, the operator sees if beneficial insects 1256 are continuing to be distributed from the first chamber 1252 or first distribution device 1120. If the first chamber 1252 or first distribution device 1120 is not empty, then flow proceeds to decision block 1520. If the first chamber 1252 or first distribution device 1120 is empty, then flow proceeds to block 1524.

At block 1524, the operator manipulates a control to close a door corresponding to the first chamber 1252 of a multiple chamber distribution device 1120 or a door 1216 of a first distribution device 1120. Each chamber 1252 of a multiple chamber distribution device 1120 contains a fixed number of beneficial insects 1256, which may only leave the chamber 1252 when the door 1216 is open. Flow proceeds to decision block 1528.

At decision block 1528, the operator or uploaded program 1036 determines if additional chambers 1252 or beneficial insect distribution devices 1120, beyond the first chamber 1252 or beneficial insect distribution device 1120, are available. A given aircraft 104, 204, 1104 may have no, one, or multiple beneficial insect distribution devices 1120, or additional chambers 1252, still containing more beneficial insects 1256. If no additional chambers 1252 or beneficial insect distribution devices 1120 are available, then flow ends. If more additional chambers 1252 or beneficial insect distribution devices 1120 are available, then flow proceeds to block 1532.

At block 1532, the operator manipulates a control to open a door 1216 corresponding to a next chamber 1252 of a multiple chamber distribution device 1120 or a door 1216 of a next distribution device 1120. Each chamber 1252 of a multiple chamber distribution device 1120 contains a fixed number of beneficial insects 1256, which may only leave the chamber 1252 when the door 1216 is open. Flow proceeds to block 1536.

At block 1536, the aircraft 104, 204, 1104 distributes beneficial insects 1256 from the next chamber 1252 of a multiple chamber distribution device 1120 or the next distribution device 1120. Flow proceeds to decision block 1520 to check for a next chamber 1252 or next distribution device 1120 containing beneficial insects.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A device for distributing granular material to a target area from an aircraft, comprising:
   one or more enclosures, comprising:
      one or more electric sifters, wherein the granular material is stored in the one or more electric sifters, each of the one or more electric sifters comprising:
         a motor to distribute the granular material on the target area; and
         a screen on a bottom surface of the electric sifter, the screen comprising one of a first portion and a second portion,
         wherein the first portion allows the granular material to pass through the screen to the target area,
         wherein the second portion prevents the granular material from passing through the screen,
      a door for each of the one or more electric sifters, the doors being below the bottom surface of each of the one or more electric sifters and hinged toward a side of the enclosure closest to a front of the aircraft, wherein granular material is only distributed when the door is in an open position, wherein each of the doors comprises a cutout on a center forward edge of the door and a flange corresponding to the size and shape of the cutout on a bottom surface of the enclosure; and
      an actuator to open and close each of the doors;
   a circuit to control the motors and actuators;
   one or more power sources to power the motor and the circuit; and
   an interface for a human operator to control the circuit.

2. The device for distributing granular material of claim 1, wherein the
   one or more enclosures are arranged horizontally symmetrically on the aircraft.

3. The device for distributing granular material of claim 2, each of the one or more enclosures comprising a top lid to add granular material to the one or more electric sifters, wherein the top lid is secured to the enclosure after the granular material is added to the one or more electric sifters.

4. The device for distributing granular material of claim 2, wherein each of the doors comprises the flange projecting in a forward direction when the door is open, wherein the flange gathers a convergent air mass through the cutout to distribute the granular material when the aircraft moves in a forward direction.

5. The device for distributing granular material of claim 4, wherein the first portion of the screen is above the cutout, wherein the second portion of the screen is over at least the rear half of the door when the door is closed.

6. The device for distributing granular material of claim 1, each of the one or more electric sifters further comprising:
   one or more springs mounted crosswise diagonally on the inside of the electric sifter between an inside surface of the electric sifter and an outside edge of the screen,
   wherein screen movement imparted by the electric sifter causes the one or more springs to vibrate sympathetically thereby causing granular material in contact with the one or more springs to move to the bottom of the electric sifter.

7. The device for distributing granular material of claim 2, wherein the one or more enclosures are positioned on the aircraft so a forward edge of the enclosure top surface is in front of a forward edge of the enclosure bottom surface, wherein the granular material accumulates in a forward portion of the bottom of the one or more electric sifters.

8. The device for distributing granular material of claim 1, wherein the granular material is a mixture of pollen and a carrier, wherein the mix ratio of the mixture is between 1:1 and 1:3 of pollen to the carrier.

* * * * *